(12) United States Patent
Yamamoto

(10) Patent No.: US 10,537,947 B2
(45) Date of Patent: Jan. 21, 2020

(54) CUTTING TOOL AND METHOD FOR MANUFACTURING CUT WORKPIECE

(71) Applicant: Kyocera Corporation, Kyoto-shi, Kyoto (JP)

(72) Inventor: Masahiro Yamamoto, Moriyama (JP)

(73) Assignee: KYOCERA CORPORATION, Kyoto-shi, Kyoto (JP)

( * ) Notice: Subject to any disclaimer, the term of this patent is extended or adjusted under 35 U.S.C. 154(b) by 0 days.

(21) Appl. No.: 15/738,643

(22) PCT Filed: Jun. 27, 2016

(86) PCT No.: PCT/JP2016/069042
§ 371 (c)(1),
(2) Date: Dec. 21, 2017

(87) PCT Pub. No.: WO2016/208771
PCT Pub. Date: Dec. 29, 2016

(65) Prior Publication Data
US 2018/0178295 A1 Jun. 28, 2018

(30) Foreign Application Priority Data
Jun. 26, 2015 (JP) .................................. 2015-128391

(51) Int. Cl.
*B23C 5/24* (2006.01)
*B23C 5/10* (2006.01)

(52) U.S. Cl.
CPC ............ *B23C 5/2472* (2013.01); *B23C 5/109* (2013.01); *B23C 2200/20* (2013.01); *B23C 2200/362* (2013.01); *B23C 2210/204* (2013.01)

(58) Field of Classification Search
CPC .... B23C 5/06; B23C 5/22; B23C 5/20; B23C 5/08; B23C 2210/16; B23C 2210/161; B23C 2210/244; B23C 2210/168; B23C 2200/20; B23B 2205/02
See application file for complete search history.

(56) References Cited

U.S. PATENT DOCUMENTS

| 3,497,934 A | * | 3/1970 | Hudson | ............... B23B 27/1662 |
| | | | | 407/78 |
| 3,708,843 A | * | 1/1973 | Erkfritz | ................ B23C 5/2208 |
| | | | | 407/104 |
| 4,875,812 A | * | 10/1989 | Haque | ................... B23B 27/065 |
| | | | | 407/104 |

(Continued)

FOREIGN PATENT DOCUMENTS

JP 2005103708 A 4/2005

*Primary Examiner* — Nicole N Ramos
(74) *Attorney, Agent, or Firm* — Viering, Jentschura & Partner MBB

(57) ABSTRACT

In an embodiment, a cutting tool includes a holder and a cutting insert. The holder is elongated and includes an insert pocket that is located on a side of a first end. The cutting insert is secured to the insert pocket. The cutting tool further includes a clamp that fastens the cutting insert in the insert pocket, and a screw that comes in contact with the cutting insert and is secured to the insert pocket. The screw includes a first surface including a first engagement portion on a first surface that is located on a side of the first end. The first engagement portion is located within a through-hole included in the screw in a front view of the first end.

20 Claims, 25 Drawing Sheets

(56) References Cited

U.S. PATENT DOCUMENTS

| | | | | |
|---|---|---|---|---|
| 5,209,610 A | * | 5/1993 | Arai | B23C 5/241 |
| | | | | 407/36 |
| 5,658,100 A | * | 8/1997 | Deiss | B23C 5/109 |
| | | | | 407/104 |
| 6,935,814 B2 | * | 8/2005 | Nagaya | B23C 5/207 |
| | | | | 407/100 |
| 8,157,487 B2 | * | 4/2012 | Satran | B23C 5/241 |
| | | | | 407/101 |
| 2007/0183857 A1 | * | 8/2007 | Wihlborg | B23C 5/06 |
| | | | | 407/67 |
| 2010/0221076 A1 | * | 9/2010 | Takahashi | B23C 5/06 |
| | | | | 407/42 |
| 2013/0129432 A1 | * | 5/2013 | Jaeger | B23C 5/207 |
| | | | | 407/42 |
| 2016/0311038 A1 | * | 10/2016 | Gamble | B23C 5/08 |

* cited by examiner

CUTTING TOOL AND METHOD FOR MANUFACTURING CUT WORKPIECE

CROSS-REFERENCE TO RELATED APPLICATIONS

The present application is a national stage entry according to 35 U.S.C. § 371 of PCT application No. PCT/JP2016/069042 filed on Jun. 27, 2016, which claims priority from Japanese application No.: 2015-128391 filed on Jun. 26, 2015, and is incorporated herein by reference in its entirety.

TECHNICAL FIELD

Various embodiments relate to a cutting tool and a method for manufacturing a cut workpiece.

BACKGROUND

A rotating cutting tool is a cutting tool known for cutting a workpiece material such as a metal. The cutting tool includes a body having a plurality of edge slots (insert pockets) on the periphery of its top end, and indexable inserts (cutting inserts) attached in the edge slots. The cutting tool further includes clamps for fastening the indexable inserts to the body in a removable manner, and screws each for adjusting the runout of the insert. The top surface of each adjustment screw is in contact with the seat surface of the corresponding insert. The adjustment screw is adjusted to position the insert.

SUMMARY

In an embodiment, a cutting tool includes a holder and a cutting insert. The holder is elongated and extends from a first end to a second end along a rotation axis, and includes an insert pocket on a side of to the first end. The cutting insert is secured to the insert pocket and includes a cutting edge and a through-hole. The cutting tool further includes a clamp that secures the cutting insert to the insert pocket, and a screw that is in contact with the cutting insert and is secured to the insert pocket. The screw includes a first engagement portion on a first surface located on a side of the first end. The first engagement portion is located within the through-hole in a front view of the first end.

BRIEF DESCRIPTION OF DRAWINGS

In the drawings, like reference characters generally refer to the same parts throughout the different views. The drawings are not necessarily to scale, emphasis instead generally being placed upon illustrating the principles of the disclosed embodiments. In the following description, various embodiments described with reference to the following drawings, in which.

DETAILED DESCRIPTION

A cutting tool according to one embodiment is described in detail with reference to the drawings. The figures referred to herein schematically show the main components of the cutting tool according to the present embodiment for ease of explanation. The cutting tool according to the disclosure may optionally include components that are not shown. The components shown in the figures may not exactly reflect their actual dimensions or dimensional proportions.

The cutting tool 1 according to one embodiment of the disclosure will now be described with reference to FIGS. 1 to 12.

Figure 1:
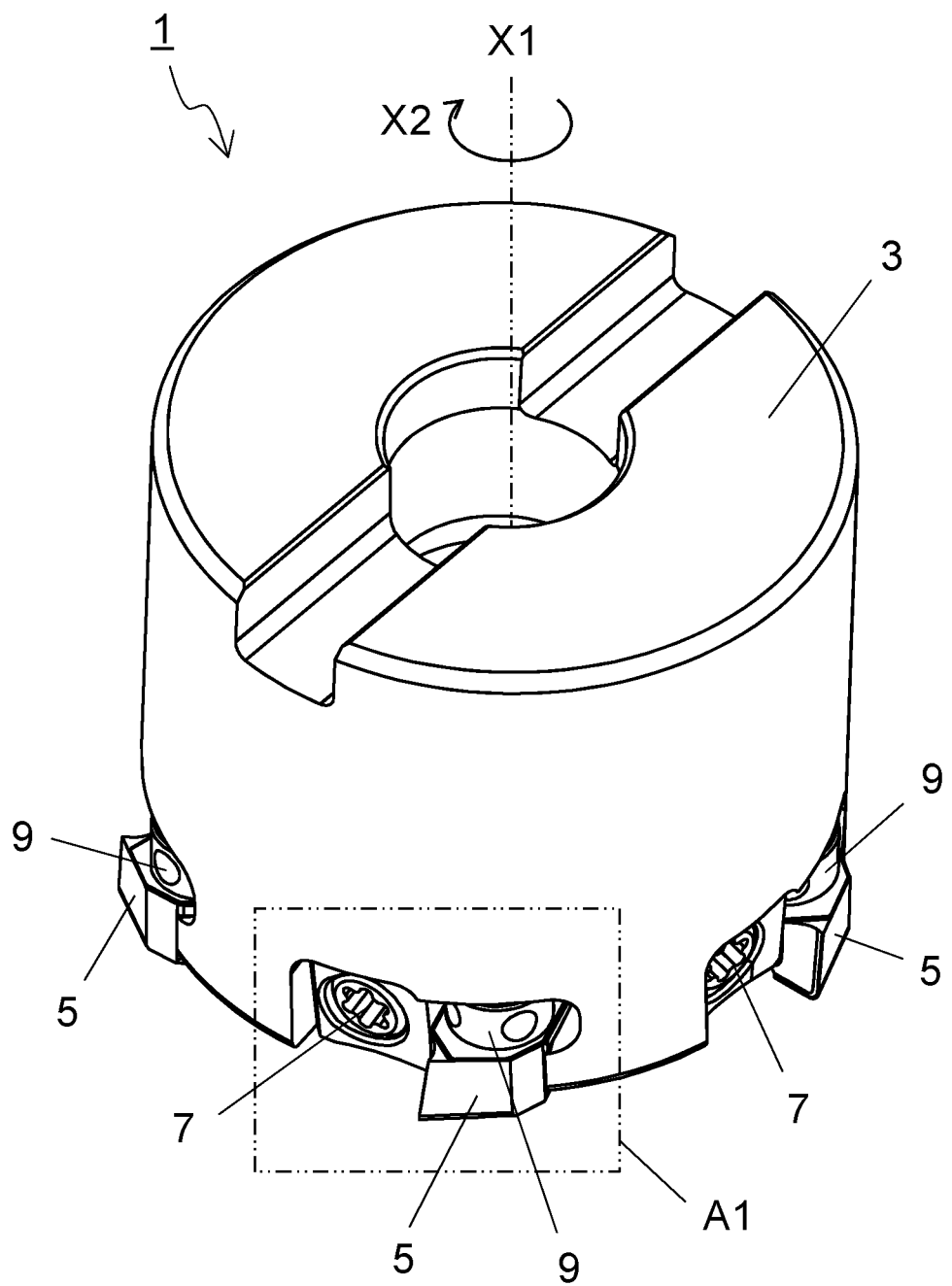
FIG. 1 is a perspective view of a cutting tool according to one embodiment of the disclosure.
Figure 2:
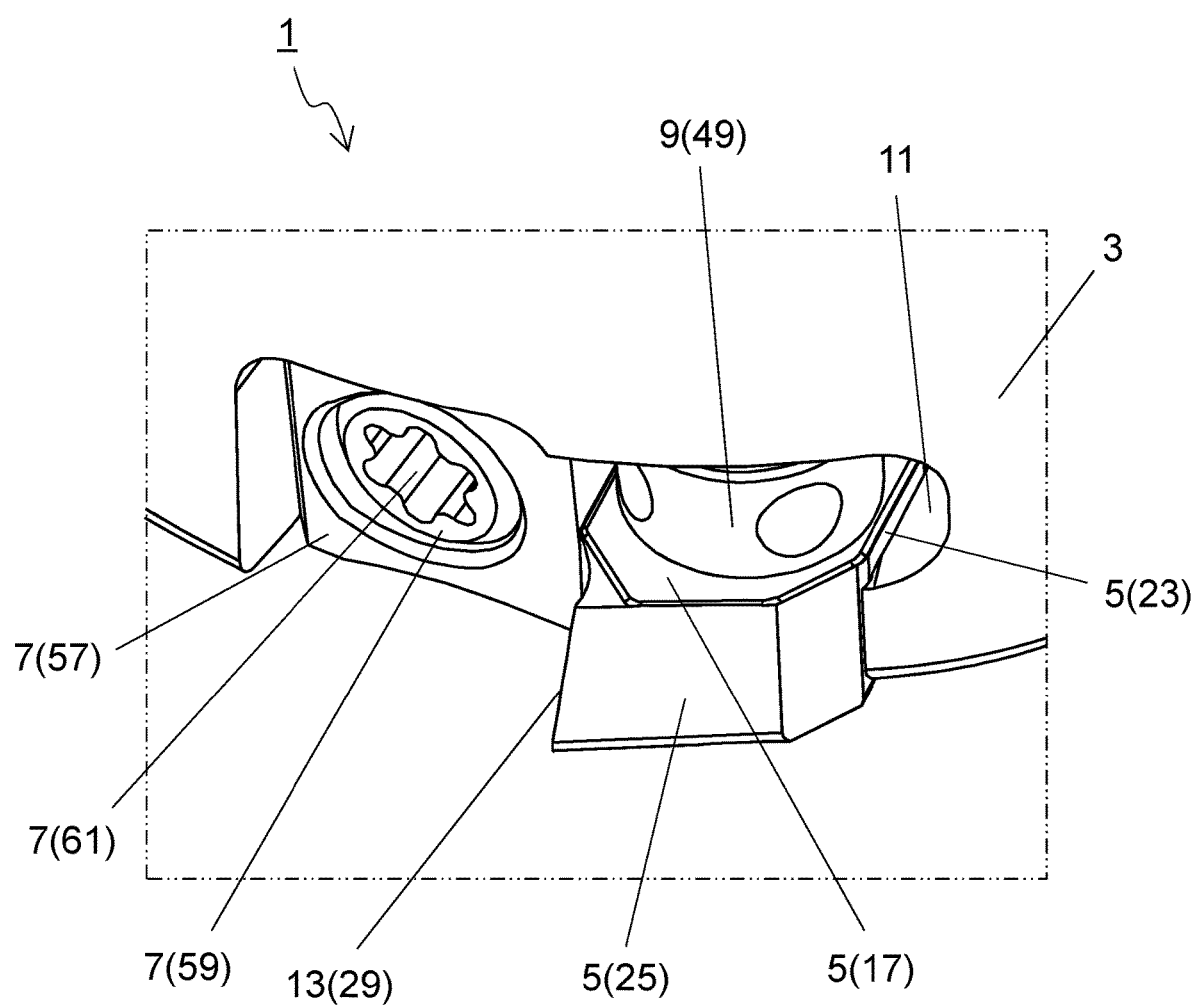
FIG. 2 is an enlarged view of an area A1 shown in FIG. 1.
Figure 3:
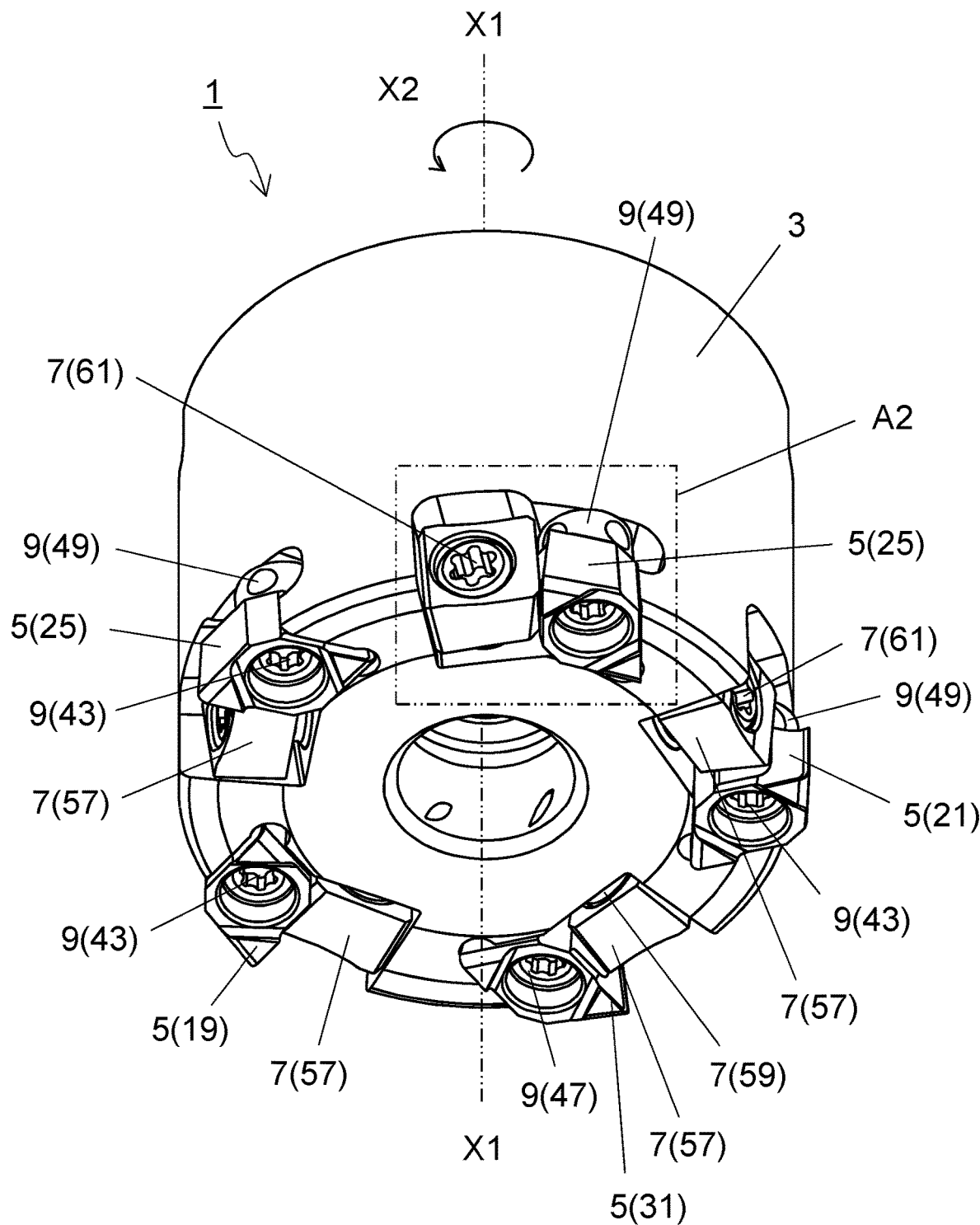
FIG. 3 is a perspective view of the cutting tool shown in FIG. 1 viewed in another direction.
Figure 5:
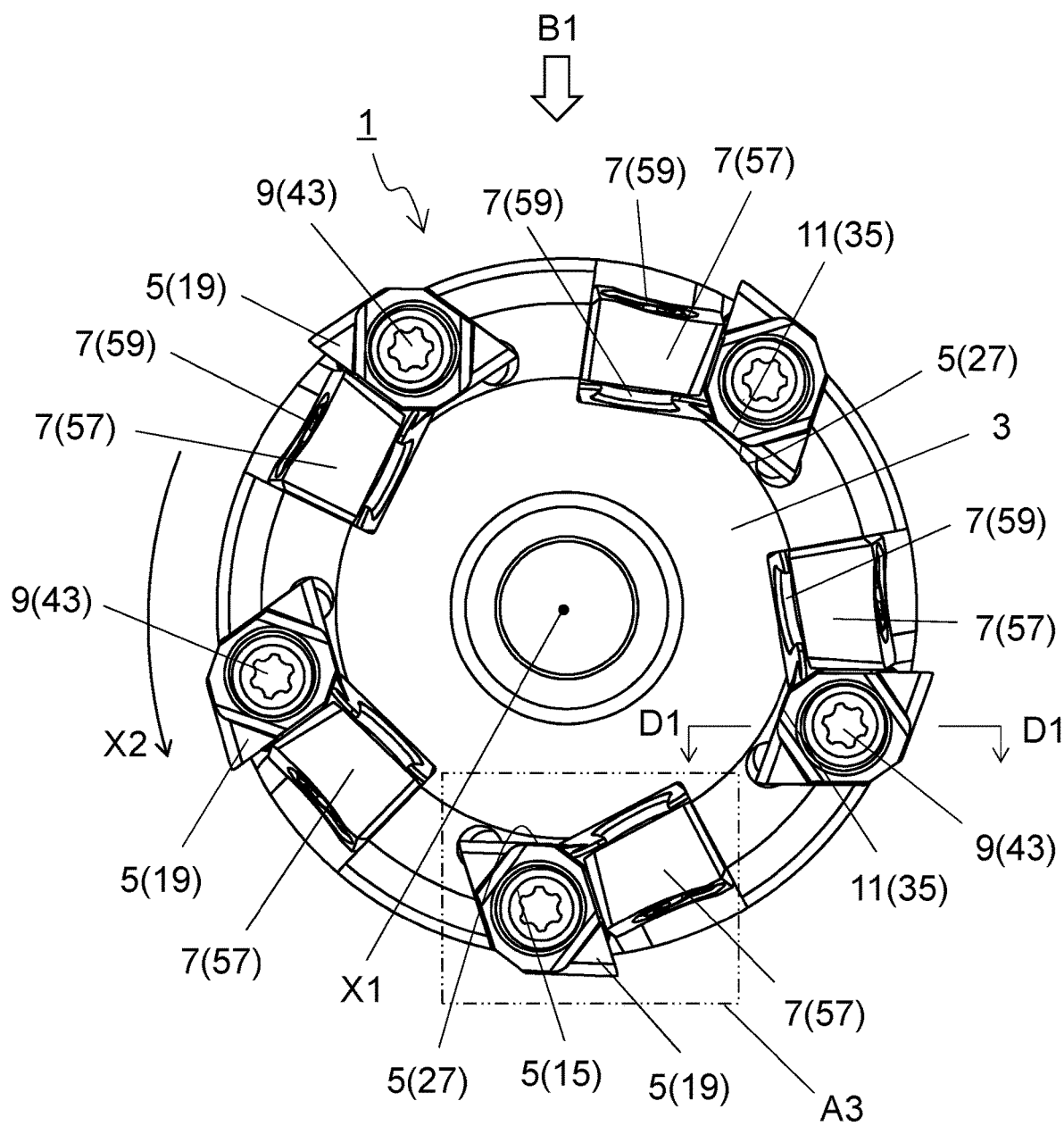
FIG. 5 is a plan view of a first end of the cutting tool shown in FIG. 1.

As shown in FIGS. 1, 3, and 5, the cutting tool 1 according to the present embodiment includes a holder 3, a plurality of cutting inserts 5 (hereafter also simply, inserts 5), a plurality of clamps 7, and a plurality of screws 9. Although the cutting tool 1 according to the present embodiment includes a plurality of inserts 5, a plurality of clamps 7, and a plurality of screws 9, it may include a single insert 5, a single clamp 7, and a single screw 9.

The holder 3 is rotatable about a rotation axis X1, and is an elongated member extending from a first end to a second end along the rotation axis X1. More specifically, the holder 3 is substantially cylindrical in the present embodiment. During cutting of a workpiece material into a cut workpiece, the holder 3 rotates about the rotation axis X1 in a rotation direction X2 shown in FIG. 1. The central axis of the holder 3 is identical to the rotation axis X1 of the holder 3 in the present embodiment.

The first end is an end at which the inserts 5 are arranged. The second end is an end opposite to the first end.

Hereafter, a top end refers to the first end, and a rear end refers to the second end. In describing the positions of the components of the cutting tool 1 relative to one another, being adjacent to the top end refers to being nearer the top end than the rear end, and being adjacent to the rear end refers to being nearer the rear end than the top end. Radially inward refers to the direction toward the rotation axis X1, and radially outward refers to the direction away from the rotation axis X1. Toward the top end refers to the direction from the rear end toward the top end of the holder 3, and toward the rear end refers to the direction from the top end toward the rear end of the holder 3. FIG. 1 is a perspective view of the cutting tool 1 showing its rear end. FIG. 3 is a perspective view of the cutting tool 1 showing its top end.

The holder 3 in the present embodiment includes a plurality of insert pockets 11 (hereafter also pockets 11) arranged adjacent to the top end. Each pocket 11 receives the insert 5 in a removable manner. The cutting tool 1 according to the present embodiment includes a plurality of inserts 5. The pockets 11 are open radially outwardly at the top end of the holder 3.

The plurality of pockets 11 are arranged at equal intervals in a manner rotationally symmetric about the rotation axis X1. This reduces variations in the cutting load applied to the inserts 5 attached in the pockets 11. The plurality of pockets 11 may also be arranged at unequal intervals about the rotation axis X.

The holder 3 may be formed from, for example, steel, cast iron, or an aluminum alloy. The cutting tool 1 according to the present embodiment may include the holder 3 formed from high-strength steel. The holder 3 may have a size determined appropriately depending on the size of the workpiece material. For example, the holder 3 has a length of, for example, about 30 to 90 mm in a direction along the rotation axis X1. The holder 3 has a width of about 20 to 500 mm (diameter) in a direction perpendicular to the rotation axis X1.

In the present embodiment, the holder 3 includes six pockets 11. The six pockets 11 each receive the insert 5 in a removable manner. The cutting tool 1 according to the present embodiment thus includes six inserts 5. Each insert 5 is fastened in the corresponding pocket 11 with a clamp 7. The cutting tool 1 according to the present embodiment thus includes six clamps 7, which are used to fasten the inserts 5 to the pockets 11. The numbers of pockets 11, inserts 5, and clamps 7 may not be six.

Each insert 5 includes a cutting edge 13 and a through-hole 15 (first through-hole 15). The insert 5 including the cutting edge 13 and the first through-hole 15 may be in any shape. The insert 5 is a substantially quadrangular prism in the present embodiment.

Figure 4:
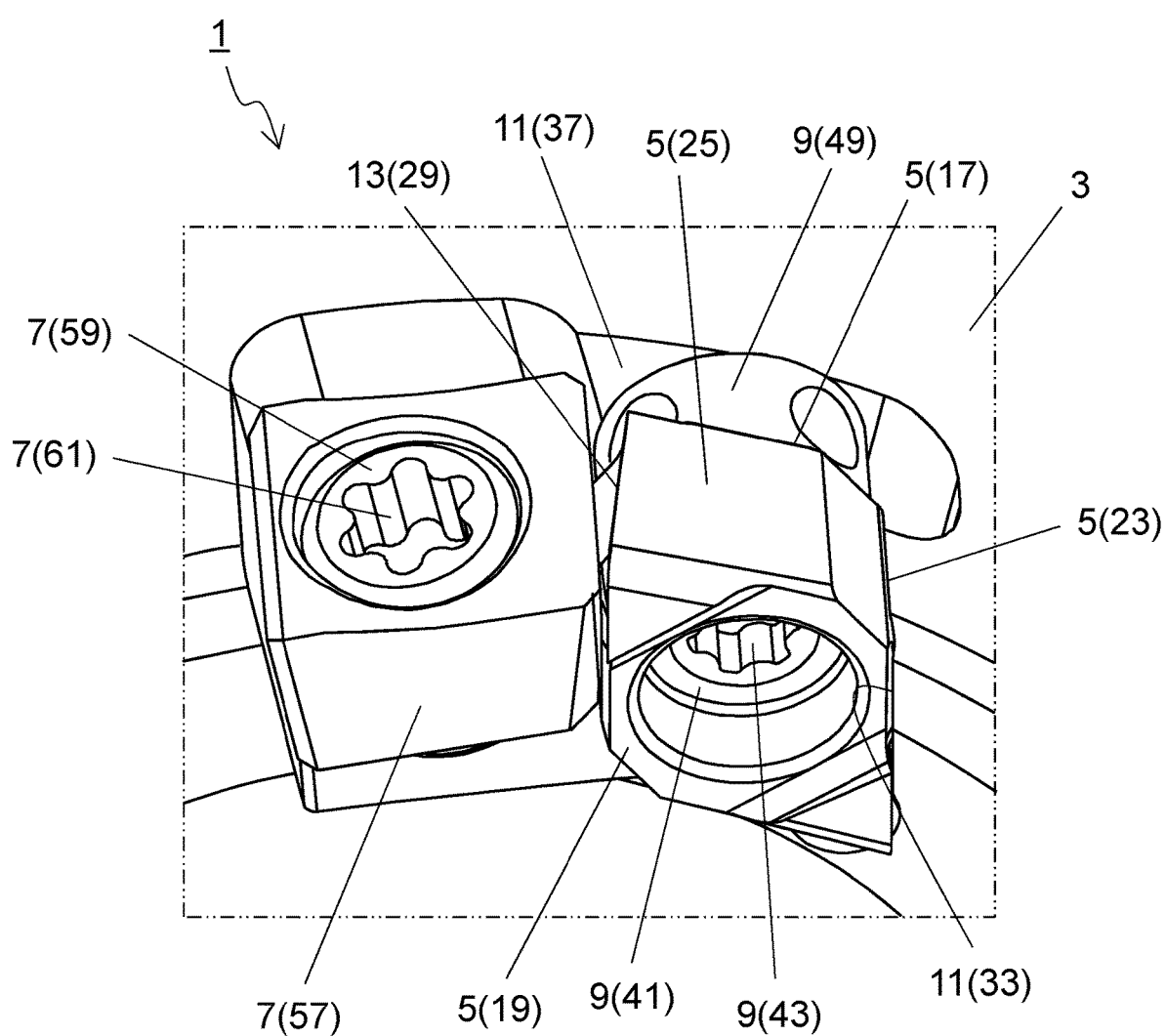
FIG. 4 is an enlarged view of an area A2 shown in FIG. 3.
Figure 6:
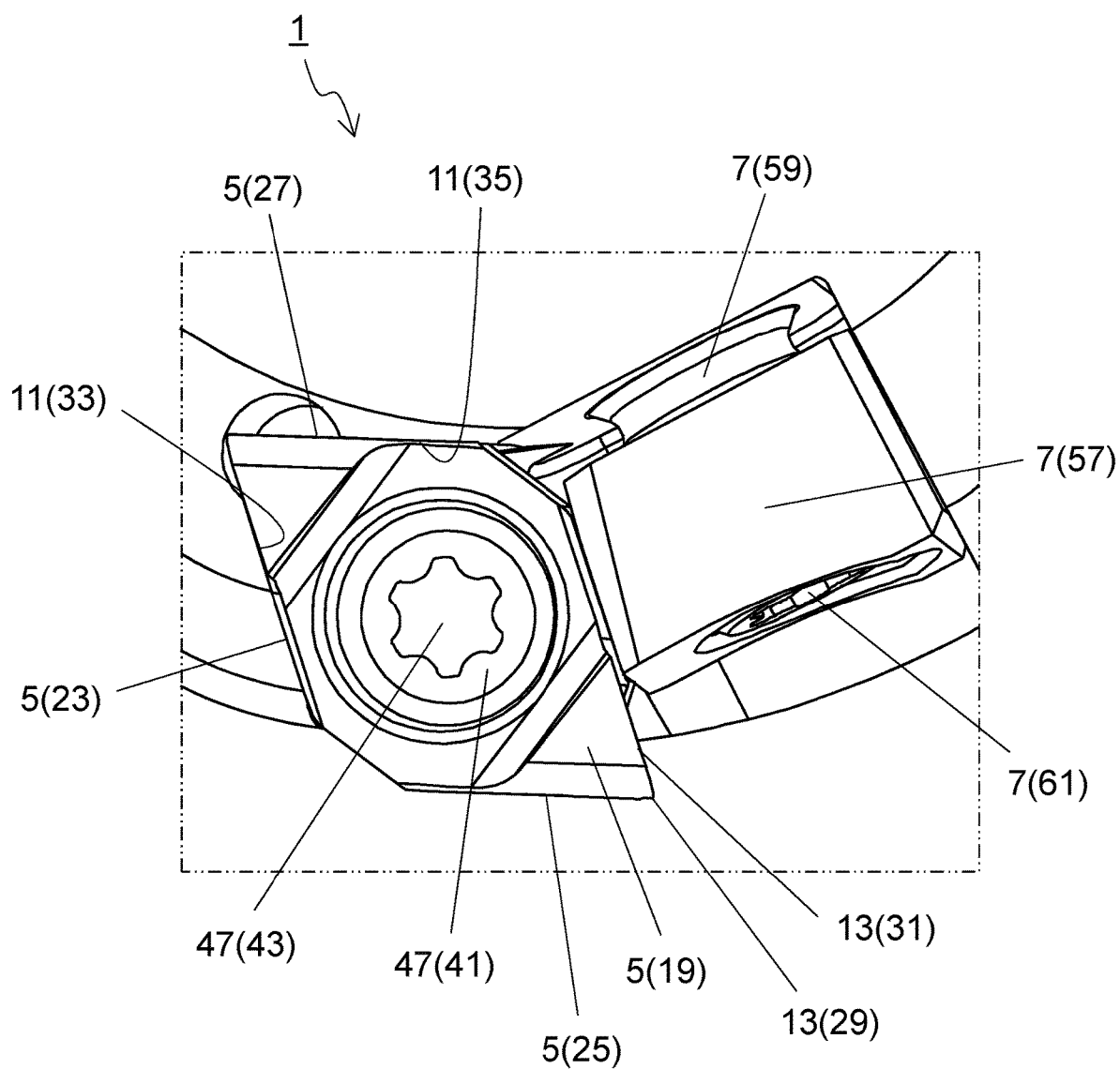
FIG. 6 is an enlarged view of an area A3 shown in FIG. 5.

More specifically, the insert 5 according to the present embodiment is a substantially quadrangular prism having a quadrangular upper surface 17, a quadrangular lower surface 19, and side surfaces connecting the upper surface 17 and the lower surface 19, as shown in FIGS. 4 and 6. When the insert 5 is attached to the holder 3, the upper surface 17 is located adjacent to the rear end and the lower surface 19 is located adjacent to the top end. The side surfaces include four surface areas, which are a front side surface 21, a back side surface 23, an outer side surface 25, and an inner side surface 27, in correspondence with the sides of the upper surface 17 and the lower surface 19.

Figure 8:
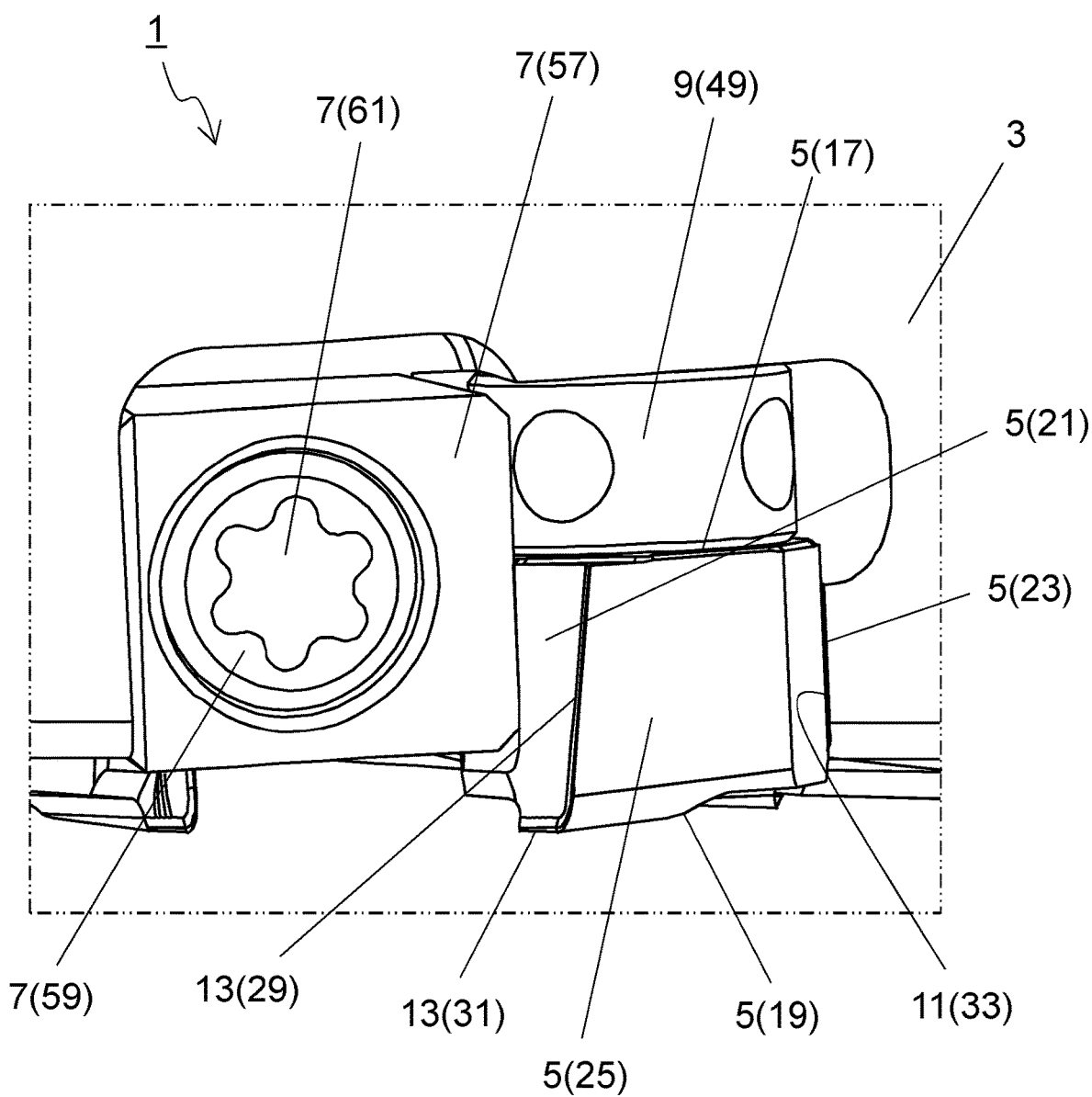
FIG. 8 is an enlarged view of an area A4 shown in FIG. 7.

As shown in FIG. 8, the upper surface 17 comes in contact with the screw 9 when the insert 5 is attached to the holder 3. The lower surface 19 protrudes toward the top end from the holder 3 when the insert 5 is attached to the holder 3. More specifically, the lower surface 19 partially protrudes toward the top end from the holder 3 in the present embodiment.

The front side surface 21 is a surface area located frontward in the rotation direction X2 when the insert 5 is attached to the holder 3. The front side surface 21 is rectangular and has its longer sides in a direction perpendicular to the rotation axis X1 when viewed from the front in the rotation direction X2. The front side surface 21 comes in contact with the clamp 7 when the insert 5 is attached to the holder 3. The back side surface 23 is a surface area located backward in the rotation direction X2 when the insert 5 is attached to the holder 3. The back side surface 23 is opposite to the front side surface 21, and comes in contact with the pocket 11 when the insert 5 is attached to the holder 3.

The outer side surface 25 is a surface area located radially outward from the holder 3 when the insert 5 is attached to the holder 3. As shown in FIG. 6, the outer side surface 25 is located radially outward from the holder 3 when the insert 5 is attached to the holder 3. The outer side surface 25 is entirely located radially outward from the holder 3 in the present embodiment.

The inner side surface 27 is a surface area located radially inward from the holder 3 when the insert 5 is attached to the holder 3. The inner side surface 27 comes in contact with the pocket 11 when the insert 5 is attached to the holder 3. The four surface areas, which are the front side surface 21, the back side surface 23, the outer side surface 25, and the inner side surface 27, are substantially quadrangular. The front side surface 21, the back side surface 23, the outer side surface 25, and the inner side surface 27 each have four corners where the surfaces meet.

The upper surface 17, the lower surface 19, the front side surface 21, the back side surface 23, the outer side surface 25, and the inner side surface 27 being quadrangular refer to those surfaces being substantially quadrangular. The surfaces may not be precisely quadrangular. Each side surface may have four round corners when viewed from the front. The sides, which connect adjacent corners, may not be precisely straight, and may be partially irregular.

The insert 5 includes the cutting edge 13. The cutting edge 13 includes a peripheral cutting edge 29. The peripheral cutting edge 29 defines a ridgeline at the boundary between the front side surface 21 and the outer side surface 25. The peripheral cutting edge 29 protrudes from the outer periphery of the holder 3 when the insert 5 is attached in the pocket 11. The cutting edge 13 includes, in addition to the peripheral cutting edge 29, a top cutting edge 31 in the cutting tool 1 according to the present embodiment. The top cutting edge 31 defines a ridgeline at the boundary between the front side surface 21 and the lower surface 19. The top cutting edge 31 protrudes from the top end of the holder 3 when the insert 5 is attached in the pocket 11. The peripheral cutting edge 29 has a length of, for example, about 1 to 10 mm. The top cutting edge 31 has a length of, for example, about 0.5 to 10 mm.

The cutting tool 1 according to the present embodiment may be used in milling. In milling, the cutting tool 1 can cut a workpiece material while its holder 3 is rotating about the rotation axis X1 and moving in a direction substantially perpendicular to the rotation axis X1. The peripheral cutting edge 29 is used as a major cutting edge used to cut the workpiece material. The top cutting edge 31 is used as a wiper edge for reducing the irregularity of the machined surface of the workpiece material.

The peripheral cutting edge 29 and the top cutting edge 31 define ridgelines between the front side surface 21 and the other side surfaces (the outer side surface 25 and the lower surface 19). The front side surface 21 is located frontward in the rotation direction X2. At least a part of the front side surface 21 thus serves as a rake face along which chips are cleared away during the cutting process.

The insert 5 is formed from, for example, a cemented carbide or a cermet. The cemented carbide may be, for example, WC—Co, WC—TiC—Co, or WC—TiC—TaC—Co. The compound WC—Co is prepared by sintering tungsten carbide (WC) to which cobalt (Co) powder has been added. The compound WC—Tic-Co is prepared by adding titanium carbide (TiC) to the compound WC—Co. The compound WC—TiC—TaC—Co is prepared by adding tantalum carbide (TaC) to the compound WC—TiC—Co. The cermet is a sintered composite of ceramic and metal materials. Examples include cermets that mainly contain a titanium compound such as titanium carbide (TiC) or titanium nitride (TiN). The surface of the insert 5 may be coated through chemical vapor deposition (CVD) or physical vapor deposition (PVD). The coating may contain, for example, TiC, TiN, titanium carbonitride (TiCN), and alumina ($Al_2O_3$). To increase the strength of the cutting edge, the insert 5 including the substrate formed from the above materials may be brazed with a sintered diamond or a sintered cubic boron nitride (CBN).

The insert 5 in the present embodiment has the first through-hole 15 extending between the lower surface 19 and the upper surface 17 facing each other. More specifically, the first through-hole 15 in the present embodiment extends in the direction along the rotation axis X1 from the lower surface 19. In other words, the first through-hole 15 is open at the lower surface 19 and the upper surface 17, but is not open at the front side surface 21, the back side surface 23, the outer side surface 25, and the inner side surface 27. The first through-hole 15 extending in the direction along the rotation axis X1 may not refer to the first through-hole 15 having its central axis extending precisely parallel to the rotation axis X1. The first through-hole 15 may extend substantially from the lower surface 19 to the upper surface 17. The first through-hole 15 may tilt with respect to the rotation axis X1 by an angle of, for example, about 10 degrees.

The screw 9 according to the present embodiment is in contact with the insert 5 and is fastened in the pocket 11. The screw 9 can position the insert 5 in the direction along the rotation axis X1 by changing the turning degree of the screw 9. The first through-hole 15 for receiving the screw 9 thus extends in the direction along the rotation axis X1.

The first through-hole 15 may extend in another direction depending on the direction in which the insert 5 is to be positioned. The first through-hole 15 for receiving the screw 9 may not extend in the direction along the rotation axis X1.

For example, when the screw 9 is used to position the insert 5 in the radial direction of the holder 3, the first through-hole 15 for receiving the screw 9 extends in the radial direction of the holder 3. More specifically, the first through-hole 15 extends from the outer side surface 25 to the inner side surface 27 of the insert 5.

The insert 5 may have any size. In its top end view (front view of the top end), for example, the insert 5 according to the present embodiment may have a maximum width of about 5 to 20 mm between the front side surface 21 and the back side surface 23. The insert 5 may also have a maximum width of about 5 to 20 mm between the inner side surface 27 and the outer side surface 25 in the top end view, and further have a maximum distance of about 3 to 10 mm between the upper surface 17 and the lower surface 19 in the direction along the central axis of the first through-hole 15.

In the cutting tool 1 according to the present embodiment, the insert 5 is attached to the holder 3 to have the peripheral cutting edge 29 tilting with respect to the rotation axis X1. This tilt angle, which is commonly referred to as an axial rake, is greater than 0 degrees and is about 20 degrees in the present embodiment.

The pocket 11 in the holder 3 has a first inner surface 33, a second inner surface 35, and a third inner surface 37. The first inner surface 33 faces frontward in the rotation direction X2 and faces the back side surface 23 of the insert 5. The second inner surface 35 is adjacent to the first inner surface 33, and faces radially outward from the holder 3. The second inner surface 35 faces the inner surface 27 of the insert 5. The third inner surface 37 is adjacent to the first inner surface 33 and the second inner surface 35, and faces the top end of the holder 3. The third inner surface 37 faces the upper surface 17 of the insert 5.

Figure 9:
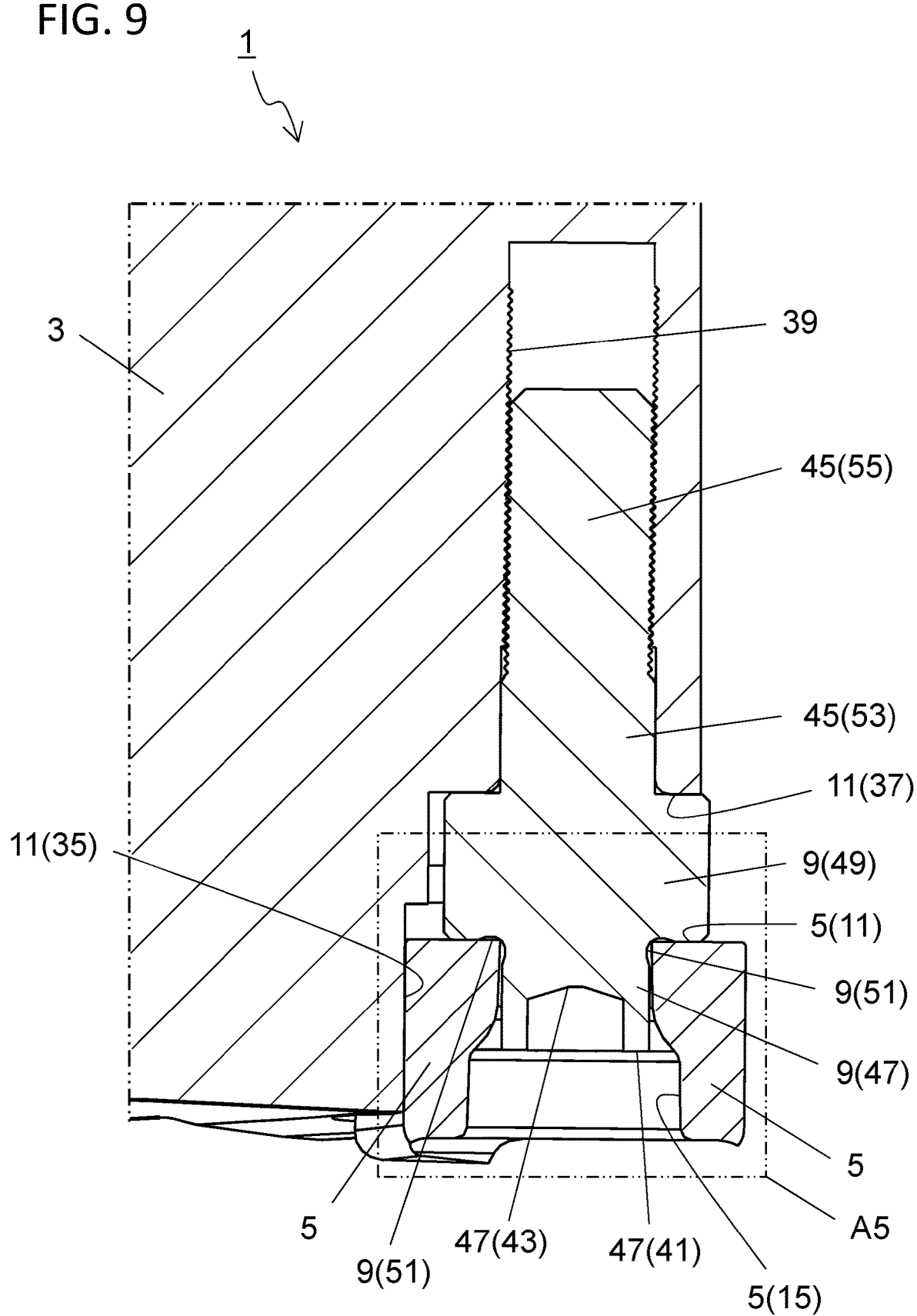
FIG. 9 is an enlarged partial cross-sectional view taken along line D1-D1 shown in FIG. 5.
Figure 10:
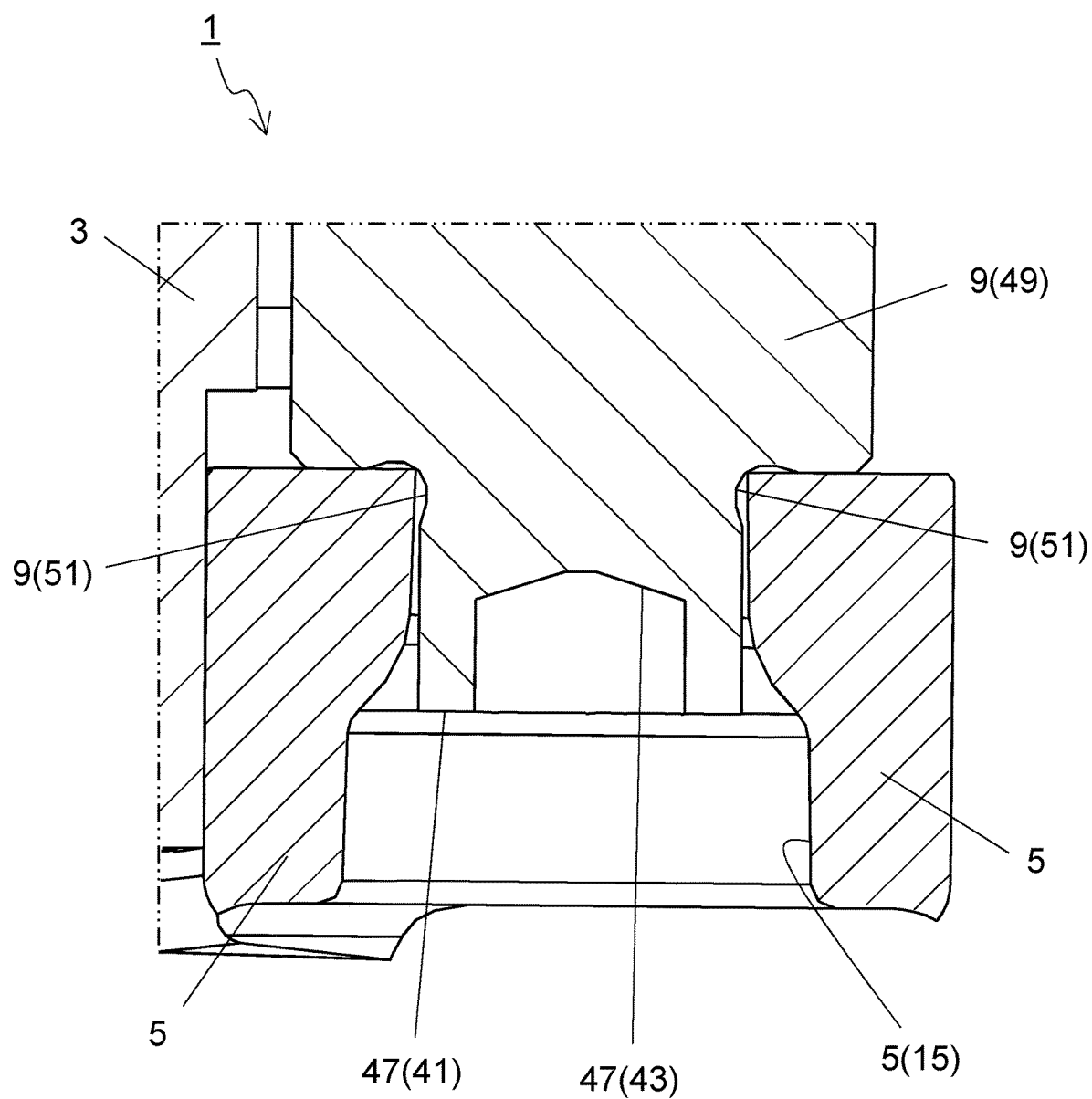
FIG. 10 is an enlarged view of an area A5 shown in FIG. 9.

As shown in FIG. 9, the pocket 11 includes a first threaded hole 39 in the third inner surface 37. In the present embodiment, the first threaded hole 39 extends in the direction along the rotation axis X1. The screw 9 is received in the first threaded hole 39 and fastened in the pocket 11. The screw 9 thus extends in the direction along the rotation axis X1. This allows positioning of the insert 5 in the direction along the rotation axis X1.

Figure 11:
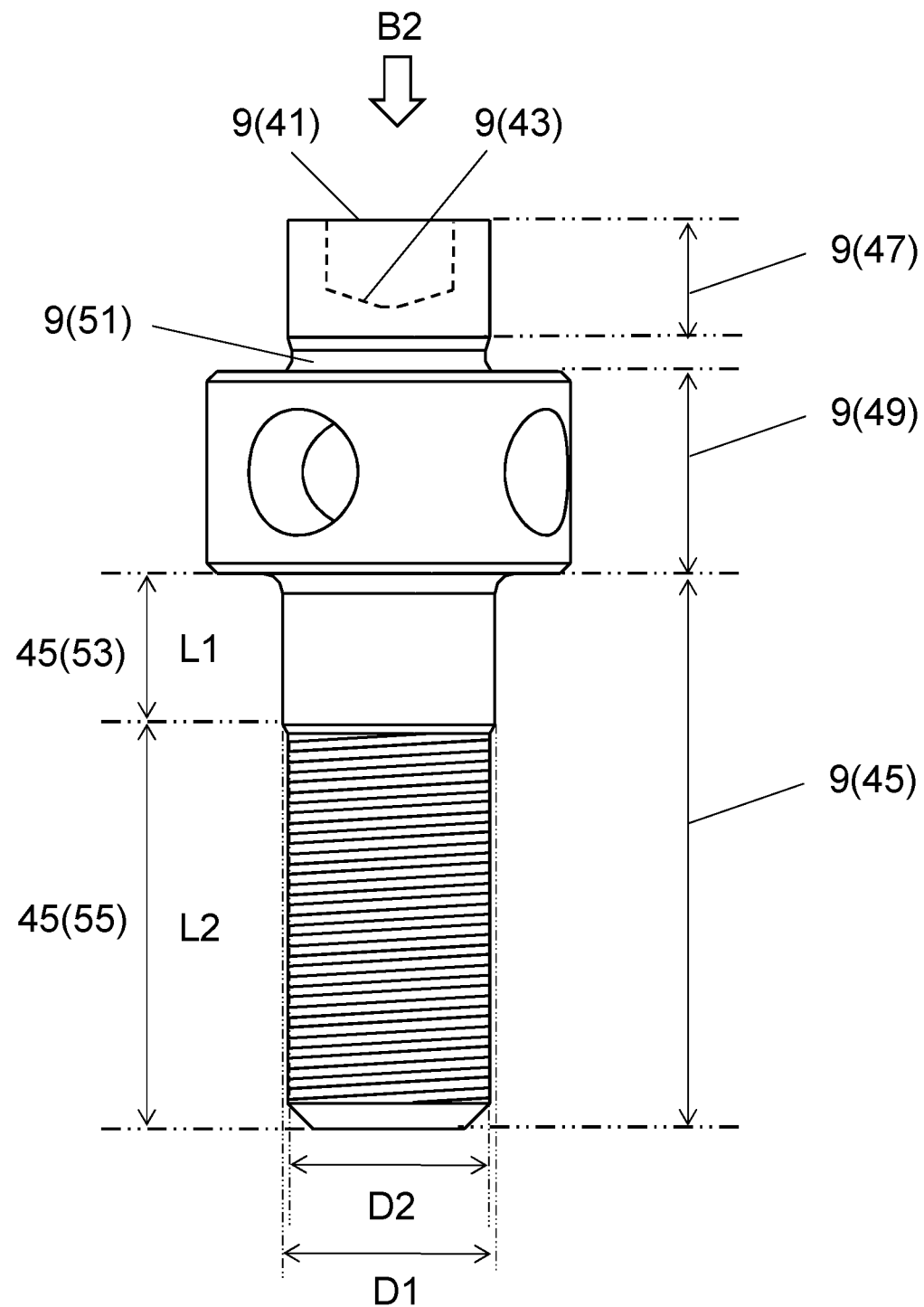
FIG. 11 is a side view of a screw used in the cutting tool according to the embodiment of the disclosure.
Figure 12:
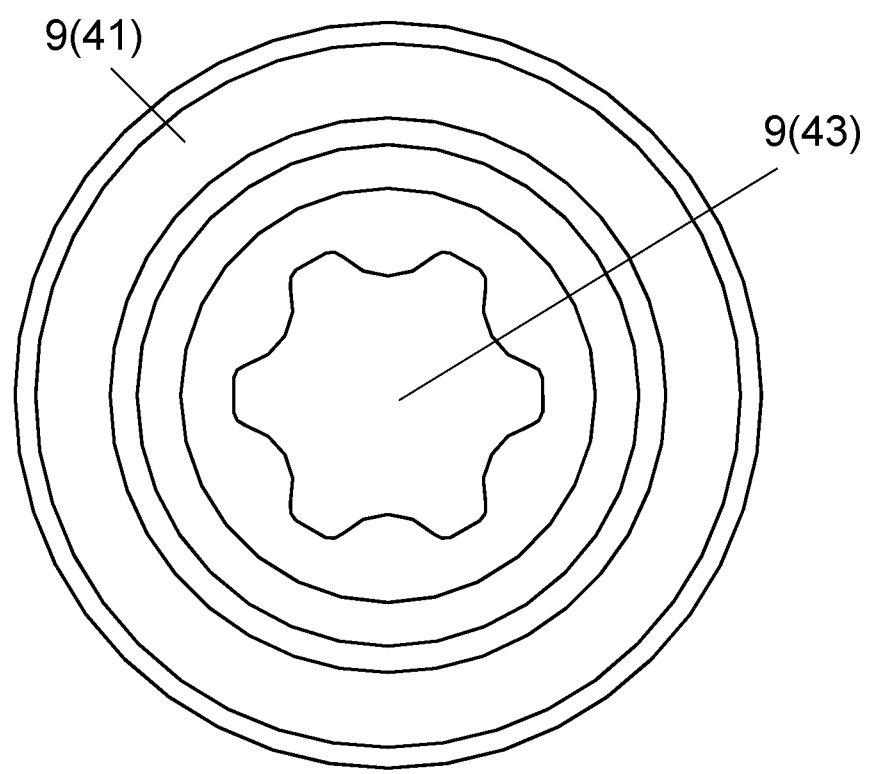
FIG. 12 is a plan view in a direction B2 shown in FIG. 11.

The screw 9 will now be described with reference to FIGS. 11 and 12. As shown in FIGS. 11 and 12, the screw 9 includes a first portion 45, a second portion 47, and a third portion 49. The first portion 45 is arranged adjacent to the rear end in the cutting tool 1. The second portion 47 is arranged adjacent to the top end in the cutting tool 1. The third portion 49 is located between the first portion 45 and the second portion 47. The screw 9 includes a first surface 41 of the second portion 47. The first surface 41 has a first engagement portion 43 (hereafter also a first operation socket 43). The first operation socket 43 is to be engaged with a member such as a wrench. The insert 5 is positioned in the direction along the rotation axis X1 by changing the turning degree of the screw 9.

The first operation socket 43 in the screw 9 is located within the first through-hole 15 in the insert 5 in the top end view. More specifically, the first operation socket 43 in the screw 9 according to the present embodiment is located within the first through-hole 15 in the insert 5 when viewed from the opening of the first through-hole 15 in the lower surface 19 as shown in FIG. 6. This allows the screw 9 to be easily turned using the first operation socket 43 through the insert 5 attached to the holder 3. In other words, the screw 9 allows the insert 5 to be easily positioned through the insert 5 attached to the holder 3.

Figure 7:
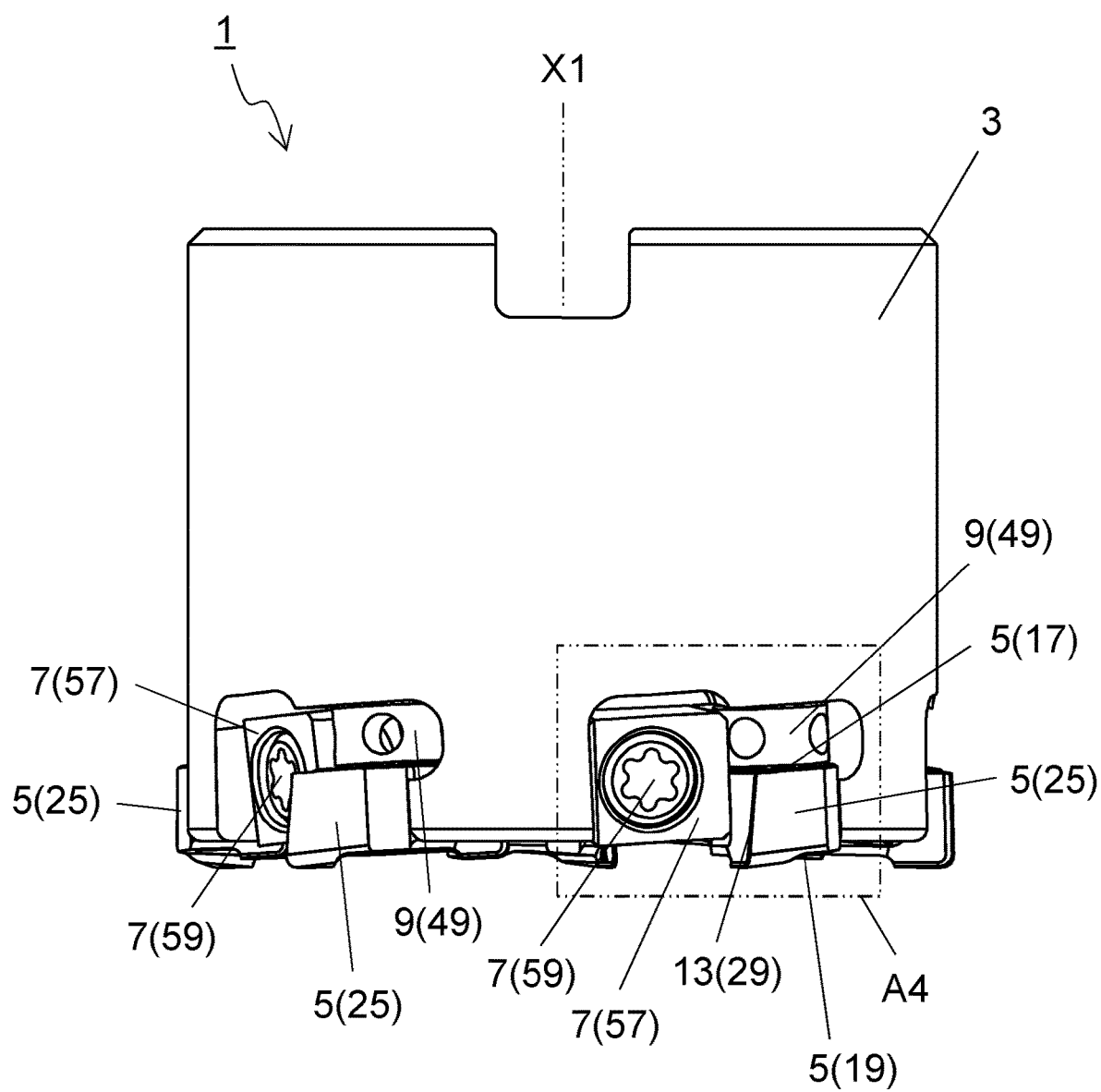
FIG. 7 is a plan view in a direction B1 shown in FIG. 5.

In the present embodiment, the first operation socket 43 in the screw 9 is also located within the first through-hole 15 in the side view of the cutting tool 1 shown in FIG. 7. More specifically, the first operation socket 43 in the screw 9 is located within the first through-hole 15 in the direction in which the first through-hole 15 extends (in the direction along the rotation axis X1), and does not protrude toward the top end of the holder 3. This structure lowers the likelihood that the insert 5 is thrown off outside. In other words, the second portion 47 of the insert 5 can be caught under a large centrifugal force during the cutting process. The insert 5 is meanwhile less likely to be thrown off outside. For the insert including the cutting edge 13 arranged nearer the opening of the first through-hole 15 that extends in the direction along the rotation axis X1, the screw 9 is less likely to touch a workpiece material during the cutting process.

As shown in FIGS. 11 and 12, the first operation socket 43 may be recessed to have a larger effective area for operation, and to provide a clearance between an operation member such as a wrench and the wall surface of the first through-hole 15. This structure improves the operability.

The screw 9 according to the present embodiment will now be described in more detail with reference to FIGS. 11 and 12.

The first portion 45, which includes thread grooves, is screwed into the first threaded hole 39 in the pocket 11. The first portion 45 of the screw 9 is screwed into the first threaded hole 39 and fastened in the pocket 11.

The second portion 47 is located within the first through-hole 15 in the insert 5. The second portion 47 corresponds to the shape of the first through-hole 15, and is cylindrical in the present embodiment. As described above, the first surface 41 includes the first operation socket 43, in which a tool such as a wrench is to be engaged. In this state, the tool is turned to turn the screw 9. The second portion 47 including the first operation socket 43 is inserted in the first through-hole 15 to allow easy positioning of the insert 5 relative to the holder 3.

The second portion 47 located within the first through-hole 15 also lowers the likelihood that the insert 5 is thrown off outside as described above.

As described above in the present embodiment, the first engagement portion 43 is recessed as shown in FIGS. 11 and 12. In this structure, the second portion 47 can have a larger outer diameter than when the first engagement portion 43 has a protrusion. This may further lower the likelihood that the insert 5 is thrown off outside.

The third portion 49 is between the first portion 34 and the second portion 47. The third portion 49 is located between the upper surface 17 of the insert 5 and the third inner surface 37 of the pocket 11 as shown in FIG. 9. The third portion 49 changes the position of the insert 5 as the screw 9 is moved. For this purpose, the third portion 49 according to the present embodiment is in contact with the upper surface 17 of the insert 5. The third portion 49 may be, for example, disk-like or cylindrical.

The screw 9 according to the present embodiment includes an annular recess 51. The recess 51 is between the second portion 47 and the third portion 49, and extends across the entire periphery of the screw 9. More specifically, the recess 51 deepens toward the central axis of the screw 9.

In the cutting tool 1, the recess 51 is located at the opening of the first through-hole 15 adjacent to the upper surface 17 in the insert 5. The annular recess 51 included in the screw 9 in the present embodiment can lower the likelihood that a concentrated load is applied between the second portion 47 and the third portion 49 during the cutting process. This structure thus increases the durability of the screw 9.

The first through-hole 15 may extend in the radial direction of the holder 3 to position the insert 5 in the radial direction of the holder 3 as described above. In this case, the third portion 49 comes in contact with the inner side surface 27 of the insert 5.

In the present embodiment, the first portion 45 includes a first section 53 and a second section 55 as shown in FIG. 11. The first section 53 is adjacent to the third portion 49. The second section 55 is adjacent to the third portion 49 with the first section 53 between them. In the cutting tool 1 according to the present embodiment, the second section 55 is adjacent to the rear end, and the first section 53 is adjacent to the top end.

The second section 55 in the first portion 45 includes the thread grooves on its periphery. The thread grooves mesh with the threads in the first threaded hole 39 to cause the screw 9 to be threaded into the pockets 11. The first section 53 includes no thread grooves, and is cylindrical. The first section 53 has an outer diameter D1 larger than an outer diameter D2 of the second section 55.

The first portion 45 including the first section 53 can be positioned in a stable manner within the first threaded hole 39 in the direction perpendicular to the longitudinal direction of the first threaded hole 39. The insert 5 can thus be positioned in a stable manner in the direction perpendicular to the longitudinal direction of the first threaded hole 39.

The screw 9 may include the second section 55 with a length L2 longer than a length L1 of the first section 53 in the direction along the central axis of the screw 9. This structure allows the first portion 45 to be positioned in a stable manner in the longitudinal direction of the first threaded hole 39, and also allows the insert 5 to be positioned in a wider range in the longitudinal direction of the first threaded hole 39.

As described above, the insert 5 is fastened to the holder 3 with the clamp 7. The clamp 7 according to the present embodiment will now be described in detail.

The clamp 7 according to the present embodiment includes a fastener 57 and a screw 59. The fastener 57 is a quadrangular prism having a second through-hole. The screw 59 is received in the second through-hole and screwed into the second threaded hole in the pocket 11.

The second threaded hole extends in the radial direction of the holder 3, which is perpendicular to the rotation axis X1. The screw 59 includes a second engagement portion 61 (hereafter also a second operation socket 61). The second operation socket 61 is to be engaged with a member such as a wrench. The clamp 7 is positioned by changing the turning degree of the screw 59.

The insert 5 is held between the pocket 11 and the fastener 57 in the clamp 7. In the clamp 7 according to the present embodiment, the screw 59 (the central axis of the screw 59) extends in a direction tilting against the front side surface 21 of the insert 5. More specifically, the screw 59 tilts toward the front side surface 21, or the screw 59 is nearer the front side surface 21 at positions more radially inward in the holder 3. In this structure, the fastener 57 approaches the insert 5 as the screw 59 is turned with a tool such as a wrench engaged with the second operation socket 61. The insert 5 is then rigidly held between the fastener 57 and the pocket 11 and fastened.

The clamp 7 according to the present embodiment is located frontward from the insert 5 in the rotation direction X2. The fastener 57 is in contact with the front side surface 21 of the insert 5. More specifically, the insert 5 is held between the clamp 7 in contact with the front side surface 21 and the first inner surface 33 of the pocket 11 in contact with the back side surface 23. The insert 5 is fastened to the clamp 7 and in the pocket 11 in this manner.

The insert 5 according to the present embodiment includes the first through-hole 15 extending from the upper surface 17 to the lower surface 19, or from the lower surface 19 to the upper surface 17. The first through-hole 15 is open at the upper surface 17 and the lower surface 19. The insert 5 is fastened between the pocket 11 and the clamp 7 at its front side surface 21 and its back side surface 25. In other words, the insert 5 is fastened between the pocket 11 and the clamp 7 along the direction perpendicular to a line extending perpendicularly from the upper surface 17 and the lower surface 19. More specifically, the insert 5 is fastened by the pocket 11 and the clamp 7 at its surfaces though which the first through-hole 15 is not open. This structure increases the area of contact between the insert 5 and the clamp 7 and between the insert 5 and the pocket 11, and allows the insert 5 to be held in a stable manner.

The clamp 7 may come in contact with the insert 5 at a position more radially inward on the front side surface 21. In this structure, the clamp 7 is less likely to receive chips flowing during the cutting process.

The first operation socket 43 in the screw 9 may have the same shape as the second operation socket 61 in the clamp 7. This structure allows the screw 9 and the clamp 7 to be operable with a single wrench, and also enhances the operability. When the first operation socket 43 has a different shape from the second operation 61, the screw 9 and the clamp 7 may be operated with different wrenches.

Figure 13:
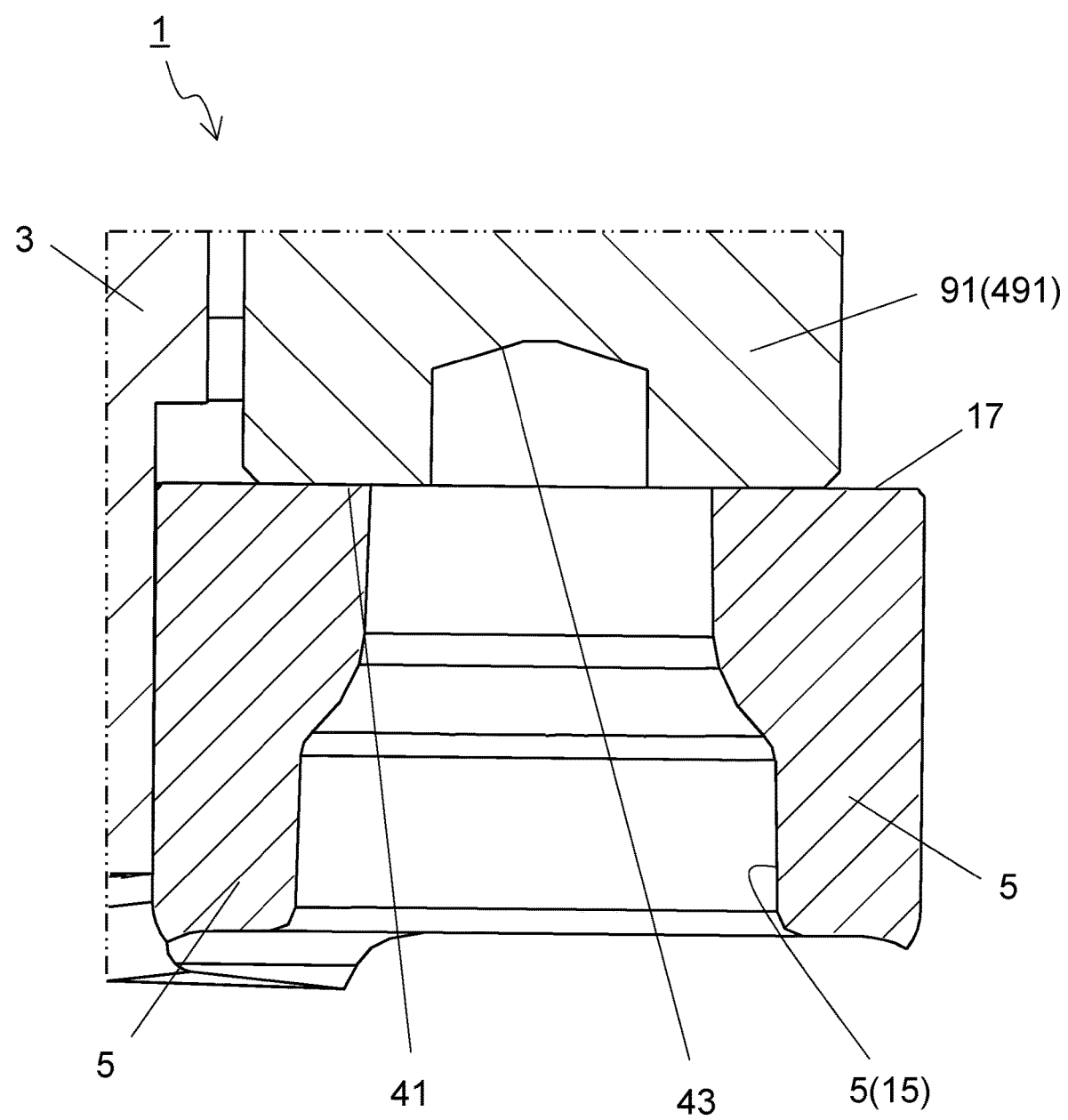
FIG. 13 is an enlarged partial cross-sectional view of the cutting tool shown in FIG. 1.

The cutting tool according to another embodiment of the disclosure will now be described with reference to FIGS. 13 and 14.

The screw in the cutting tool according to the present embodiment has a shape different from the shape of the screw in the cutting tool 1 according to the above embodiment. The screw will be described below, and other components will not be described.

Figure 14:
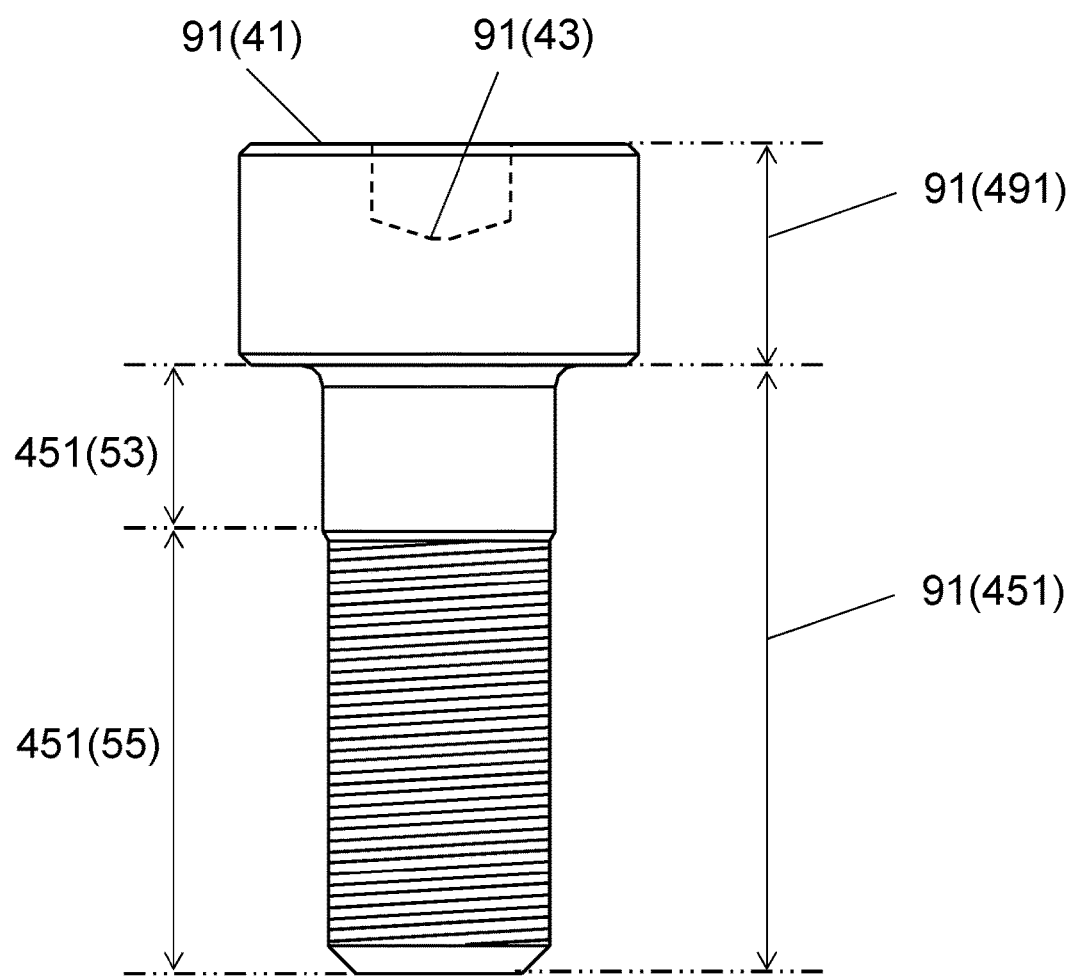
FIG. 14 is a side view of another screw used in the cutting tool according to the embodiment of the disclosure.

The screw 91 according to the present embodiment includes a first portion 451 and a third portion 491 as shown in FIG. 14. More specifically, the screw 91 according to the present embodiment eliminates the second portion 47, which is included in the screw 9. In the present embodiment, the third portion 491 includes the first surface 41, and the first surface 41 includes the first operation socket 43. As shown in FIG. 13, the first surface 41 of the third portion 491 comes in contact with the upper surface 17 of the insert 5 when the insert 5 is attached to the holder 3.

As in the first embodiment, the first operation socket 43 is located within the first through-hole 15 in the top end view in the present embodiment. The first operation socket 43 thus allows the screw 91 to be easily turned through the insert 5 attached to the holder 3 as described above. In other words, the screw 91 allows the insert 5 to be easily positioned through the insert 5 attached to the holder 3.

The screw 91 according to the present embodiment may have a simpler shape than the screw 9. This lowers the cost of the screw 91.

The cutting tool according to still another embodiment of the disclosure will now be described with reference to FIGS. 15 to 18.

The first engagement portion of the screw in the cutting tool according to the present embodiment has a shape different from the shape of the first engagement portion of the screw in the cutting tool 1 according to the other embodiments described above. The screw will be described below, and other components will not be described.

Figure 15:
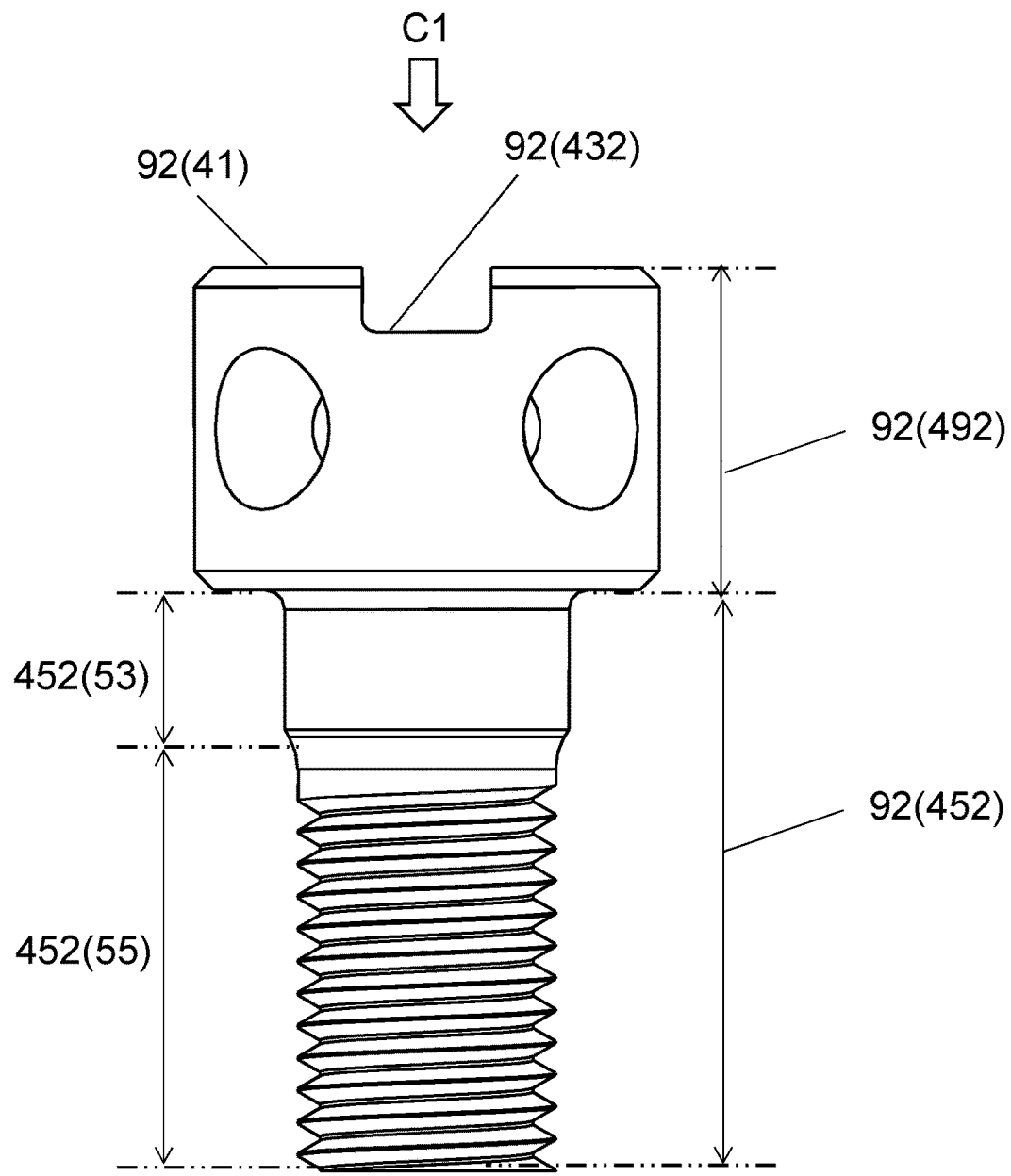
FIG. 15 is a side view of another screw used in the cutting tool according to the embodiment of the disclosure.
Figure 16:
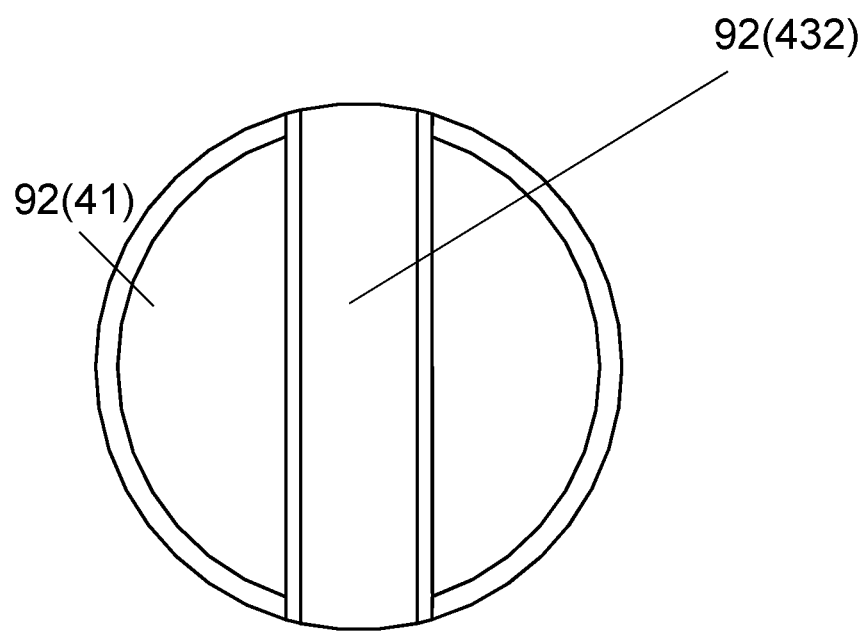
FIG. 16 is a plan view of the screw viewed in a direction C1 shown in FIG. 15.

The screw 92 according to the present embodiment includes a first portion 452 and a third portion 492 as shown in FIGS. 15 and 16. The third portion 492 has a first surface 41 including a first engagement portion 432. The first engagement portion 432 is a recessed groove in the present embodiment. The recessed groove may be engaged with, for example, a flat-blade screwdriver, which is then turned to turn the screw 92.

Figure 17:
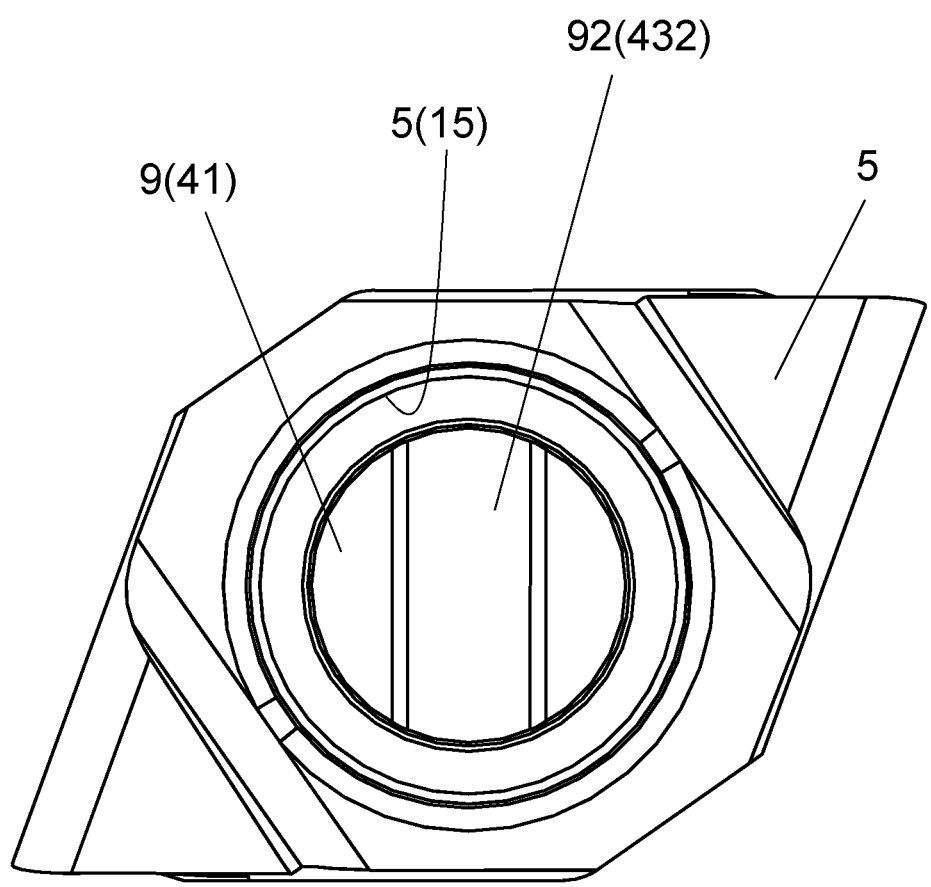
FIG. 17 is a schematic plan view of the screw shown in FIG. 15 and a cutting insert, describing their positional relationship.

As in the other embodiments, the first engagement portion 432 is located within the first through-hole 15 in the top end view as shown in FIG. 17 in the present embodiment. The first operation socket 432 thus allows the screw 92 to be easily turned through the insert 5 attached to the holder 3 as described above. In other words, the screw 9 allows the insert 5 to be easily positioned through the insert 5 attached to the holder 3.

Additionally, the first engagement portion 432 is recessed and grooved in the present embodiment. This structure enhances the operability as described above, and further eliminates the use of a dedicated wrench, and thus also increases the applicability.

Figure 18:
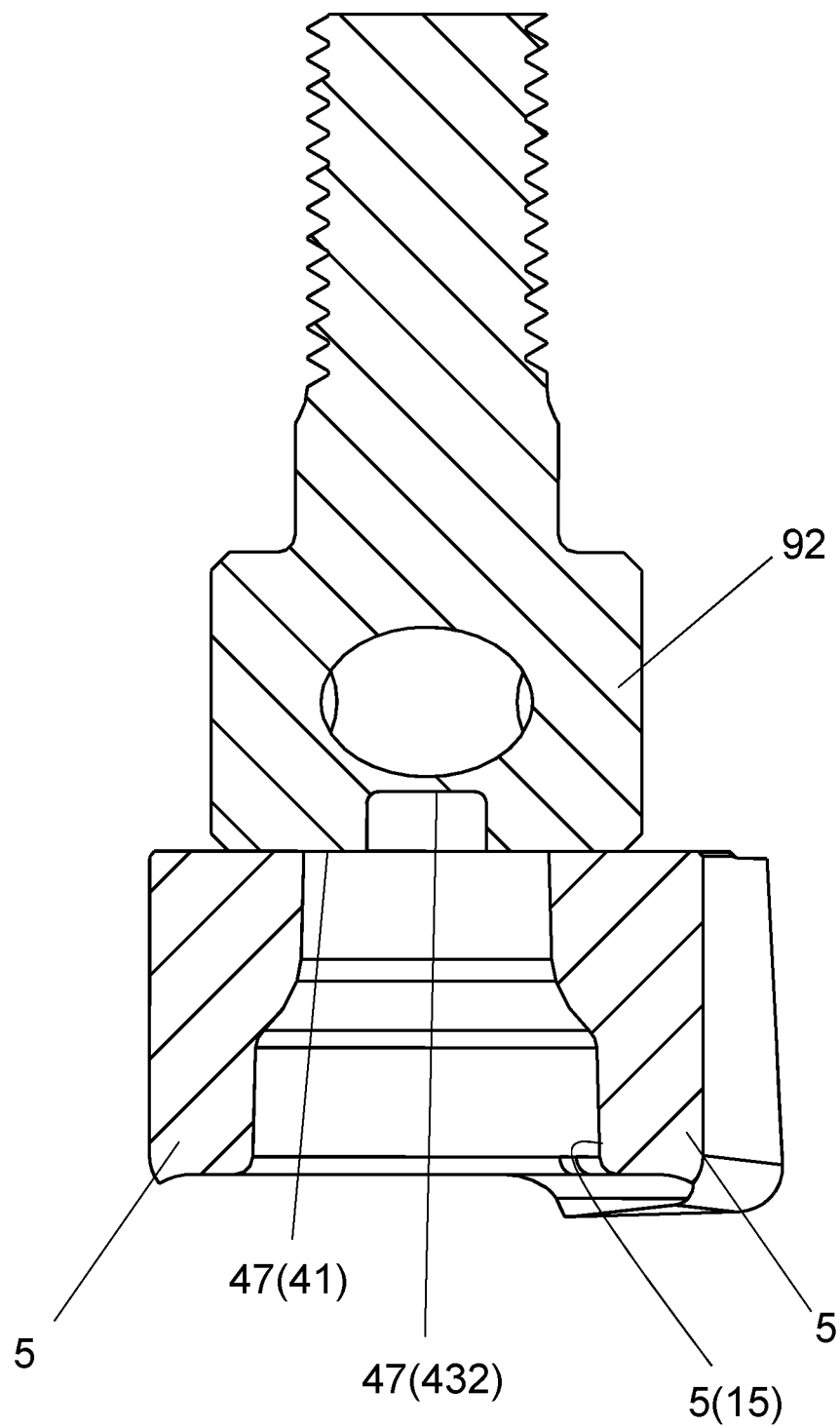
FIG. 18 is a schematic cross-sectional view of the screw shown in FIG. 15 and the cutting insert, describing their positional relationship.

In the present embodiment, the first engagement portion 433 is not located in the first through-hole 15 in the cross-sectional view shown in FIG. 18.

The cutting tool according to still another embodiment of the disclosure will now be described with reference to FIGS. 19 to 22.

The first engagement portion of the screw in the cutting tool according to the present embodiment has a shape different from the shape of the first engagement portion of the screw in the cutting tool according to the other embodiments described above. The screw will be described below, and other components will not be described.

Figure 19:
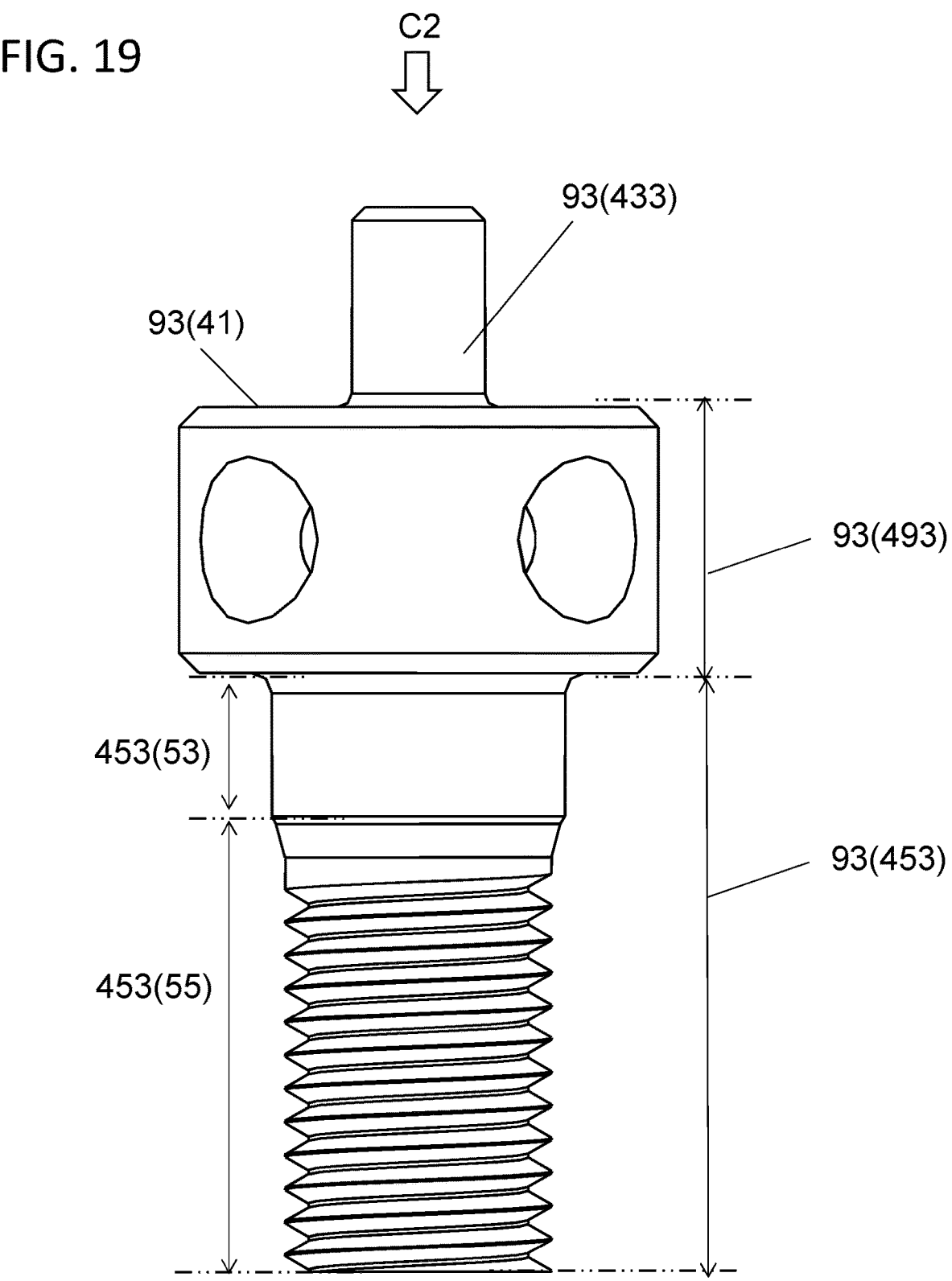
FIG. 19 is a side view of a screw used in the cutting tool according to another embodiment of the disclosure.
Figure 20:
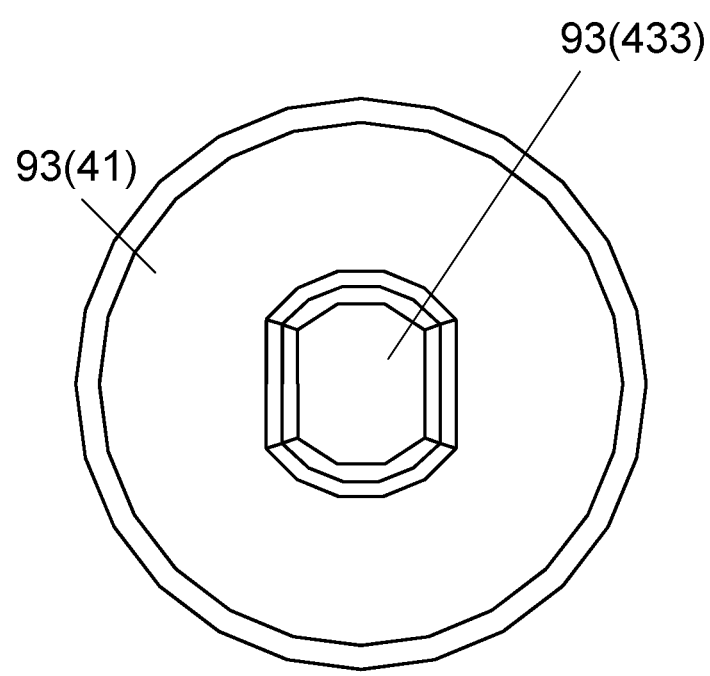
FIG. 20 is a plan view in a direction C2 shown in FIG. 19.

The screw 93 according to the present embodiment includes a first portion 453 and a third portion 493 as shown in FIGS. 19 and 20. The third portion 493 has a first surface 41 including a first engagement portion 433. The first engagement portion 433 protrudes in the present embodiment. More specifically, the first engagement portion 433 is a protrusion from the first surface 41. The protrusion may be engaged with a member such as a wrench, which is then turned to turn the screw 93.

Figure 21:
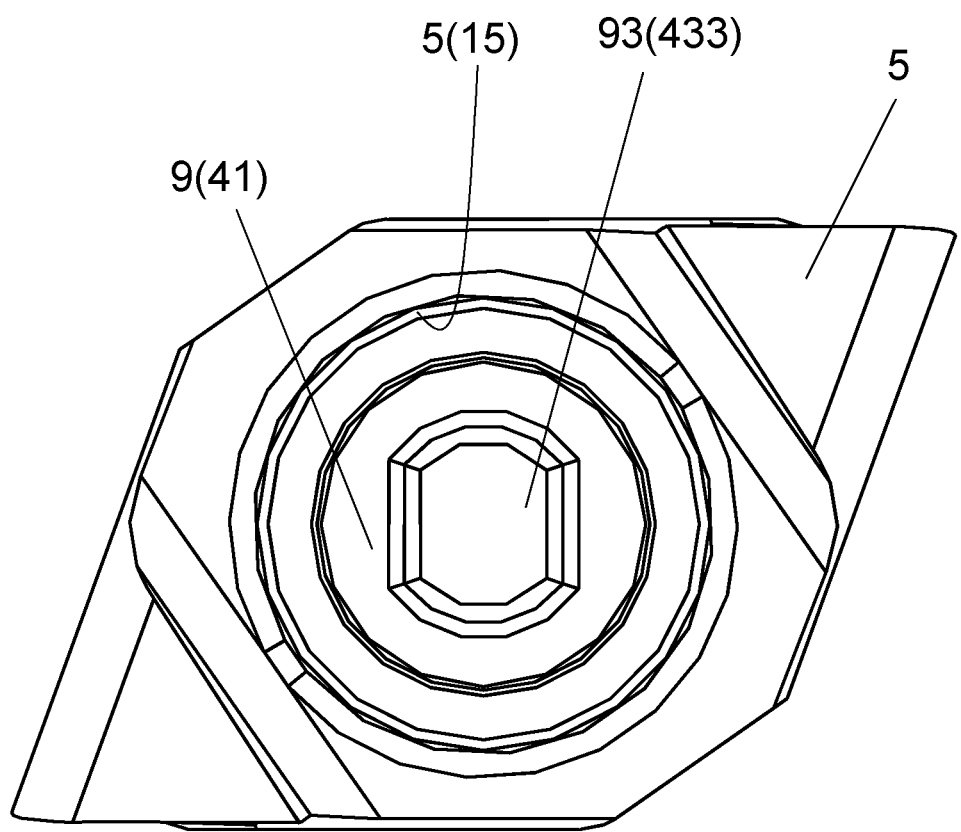
FIG. 21 is a schematic plan view of the screw shown in FIG. 19 and a cutting insert, describing their positional relationship.

As in the other embodiments, the first engagement portion 433 is located within the first through-hole 15 in the top end view as shown in FIG. 21 in the present embodiment. The first operation socket 433 thus allows the screw 93 to be easily turned in the insert 5 attached to the holder 3 as described above. In other words, the screw 93 allows the insert 5 to be easily positioned through the insert 5 attached to the holder 3.

Figure 22:
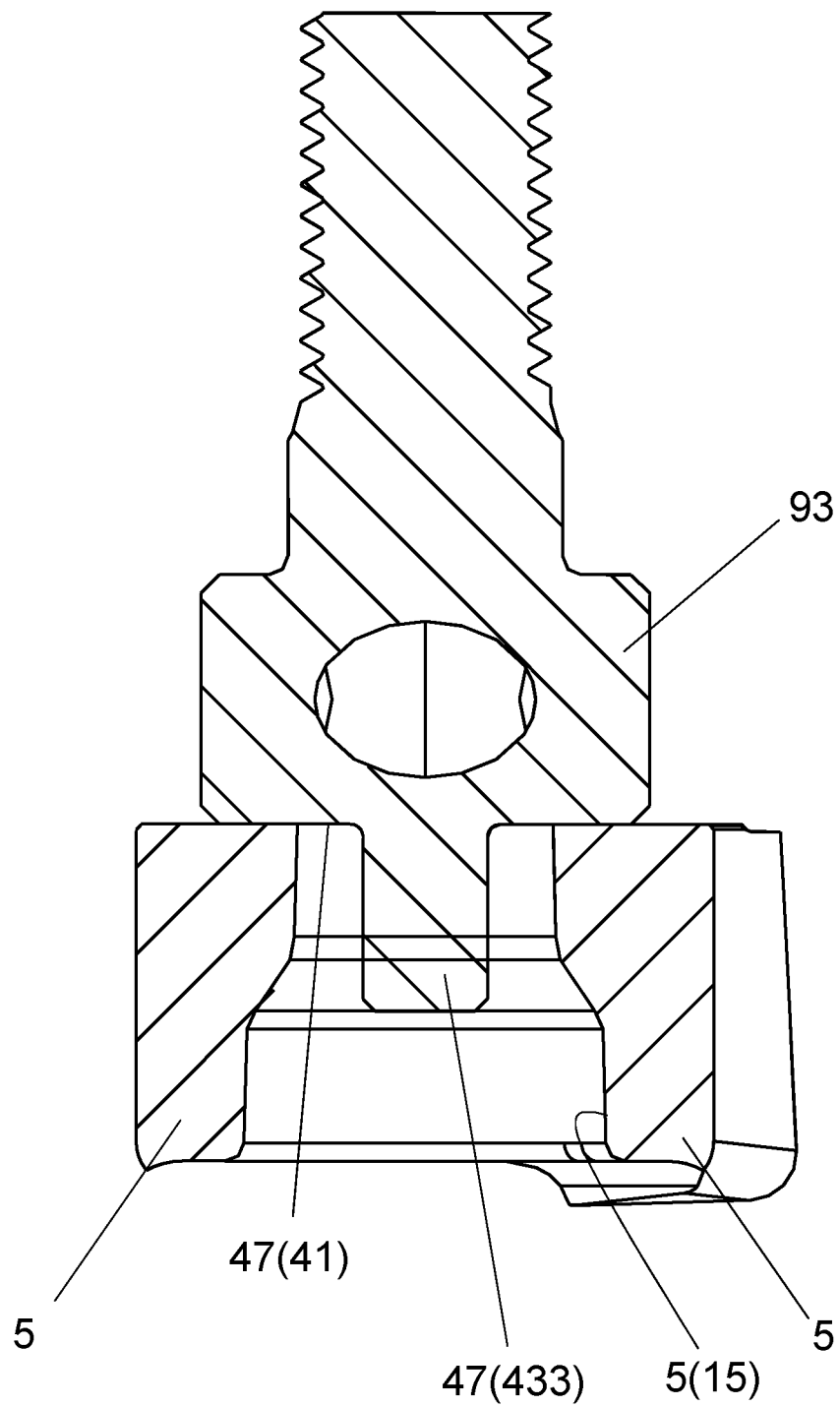
FIG. 22 is a schematic sectional view of the screw shown in FIG. 19 and the cutting insert, describing their positional relationship.

In the present embodiment, the first engagement portion 433 is further located through the first through-hole 15 in the cross-sectional view shown in FIG. 22. This structure lowers the likelihood that the insert 5 is thrown off outside.

The screw 93 according to the present embodiment eliminates the second portion, and includes a protruding first engagement portion 432. This structure lowers the cost of the screw 9, and lowers the likelihood that the insert 5 is thrown off outside.

A cutting tool according to still another embodiment of the disclosure will now be described.

A screw included in the cutting tool according to the present embodiment includes a third portion that has a shape different from the shape of the third portion in the screw included in the cutting tool according to the embodiment described above. The screw will be described below, and other components will not be described.

In the present embodiment, the third portion 49 includes a tapered portion with the outer diameter decreasing from the second portion 47 toward the first portion 45. More specifically, the third portion 49 has a larger width at a position adjacent to the second portion 47 than at a position adjacent to the first portion 45 in the direction perpendicular to the first through-hole 15.

The third portion 49 having a relatively larger width at a position adjacent to the second portion 47 increases the area of contact between the insert 5 and the screw 9. This structure allows the screw 9 to hold the insert 5 in a stable manner. Further, the third portion 49 having a relatively smaller width at a position adjacent to the first portion 45 allows the holder 3 to be thicker. This structure increases the durability of the holder 3.

Although the cutting tool according to the specific embodiments of the disclosure has been described above, the cutting tool according to the disclosure is not limited to these embodiments. For example, the embodiments described above may be combined in various forms.

A method for manufacturing a cut workpiece according to one embodiment of the disclosure will now be described with reference to the drawings.

The cut workpiece is manufactured by cutting a workpiece material. The method for manufacturing the cut workpiece according to the present embodiment includes the processes described below:

(1) rotating the cutting tool 1 according to the above embodiment about the rotation axis X1, (2) placing the cutting edge 13 included in the rotating cutting tool 1 in contact with the workpiece material 101, and (3) moving the cutting tool 1 away from the workpiece material 101.

Figure 23:
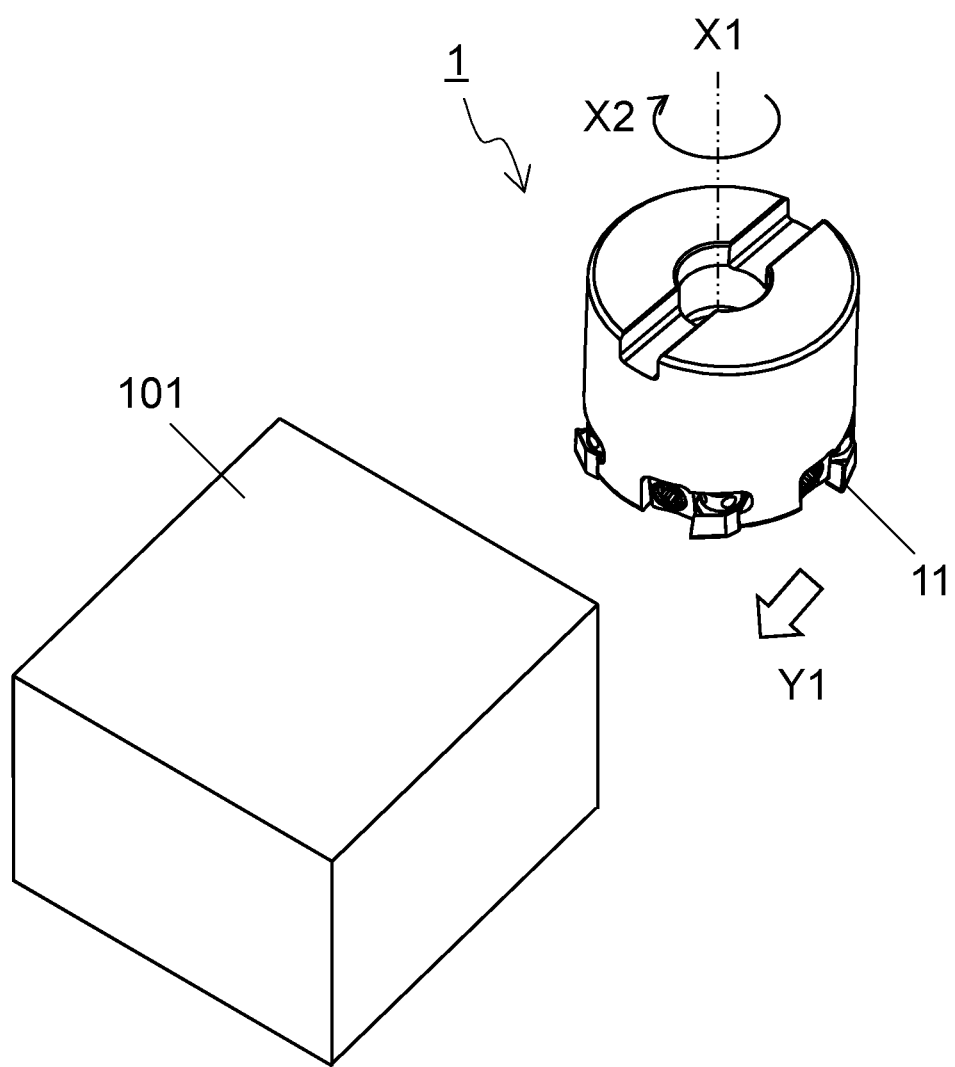
FIG. 23 is a schematic diagram of a process included in a method for manufacturing a cut workpiece according to one embodiment of the disclosure.
Figure 24:
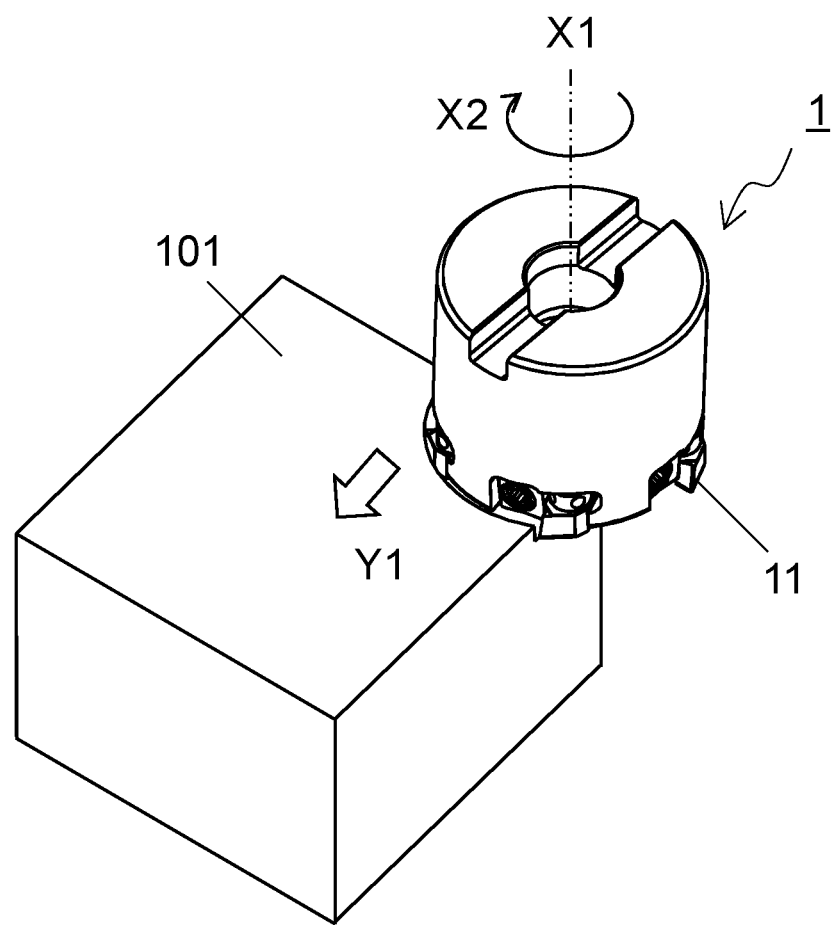
FIG. 24 is a schematic diagram of a process included in the method for manufacturing the cut workpiece according to the embodiment of the disclosure.
Figure 25:
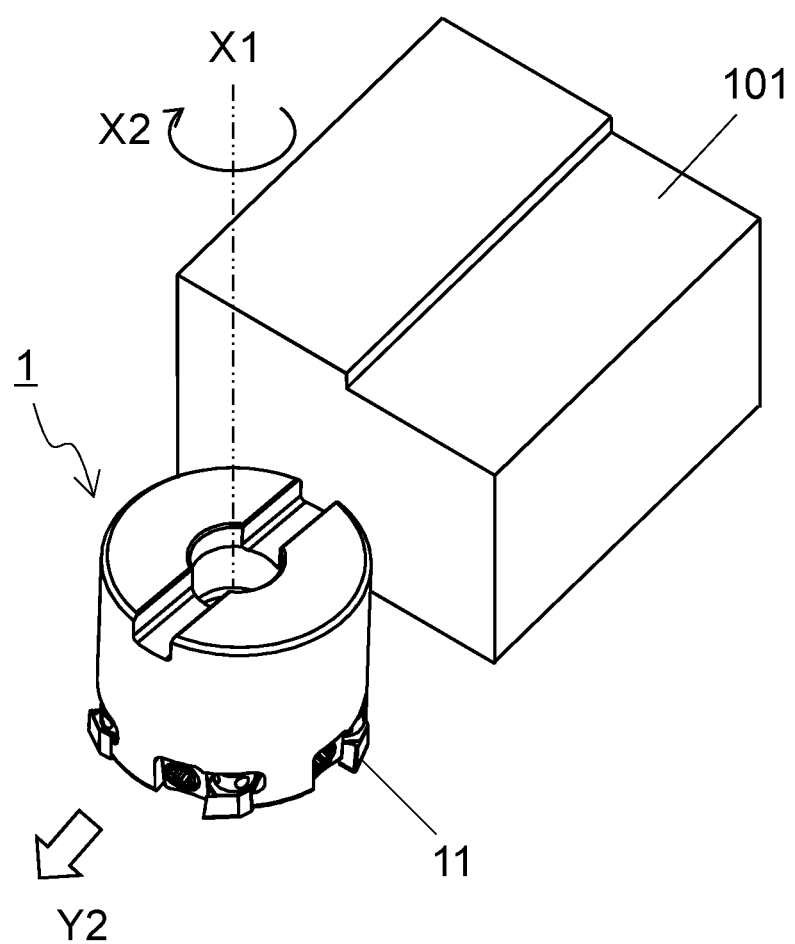
FIG. 25 is a schematic diagram showing a process included in the method for manufacturing the cut workpiece according to the embodiment of the disclosure.

More specifically, as shown in FIG. 23, the cutting tool 1 is first rotated about the rotation axis X1 while being moved in a direction Y1. This allows the cutting tool 1 to approach the workpiece material 101. Subsequently, as shown in FIG. 24, the cutting edges included in the cutting tool 1 are placed in contact with the workpiece material 101 to cut the workpiece material 101. Using the reference numerals in the present embodiment, the top cutting edges 31 and the peripheral cutting edges 29 in the insert serve as the cutting edges 13 that are placed in contact with the workpiece material 101. As shown in FIG. 25, the cutting tool 1 is then moved in a direction Y2 to be away relative from the workpiece material 101.

In the present embodiment, the workpiece material 101 is fixed, and the cutting tool 1 is moved toward the workpiece material 101 while the cutting tool 1 is rotated about the rotation axis X1. The cutting edges included in the rotating inserts are placed in contact with the workpiece material 101 to cut the workpiece material 101 in FIG. 24. In FIG. 25, the cutting tool 1 is relatively moved away from the workpiece material 101 while rotating.

In the cutting processing implemented with the manufacturing method according to the present embodiment, the cutting tool 1 is moved to be in contact with the workpiece material 101, or to be moved away from the workpiece material 101 in each process. However, the method is not limited to the embodiment.

For example, the workpiece material 101 may be moved toward the cutting tool in process (1). Similarly, the workpiece material 101 may be moved away from the cutting tool 1 in process (3). To continue the cutting processing, the cutting edges included in the inserts may be repeatedly placed in contact with different portions of the workpiece material 101 while the cutting tool 1 remains being rotated.

The workpiece material 101 may be typically be formed from aluminum, carbon steel, alloy steel, stainless steel, cast iron, or nonferrous metals.

While the disclosed embodiments have been particularly shown and described with reference to specific embodiments, it should be understood by those skilled in the art that various changes in form and detail may be made therein without departing from the spirit and scope of the disclosed embodiments as defined by the appended claims. The scope of the disclosed embodiments is thus indicated by the appended claims and all changes which come within the meaning and range of equivalency of the claims are therefore intended to be embraced.

What is claimed is:

1. A cutting tool, comprising:
a holder elongated, extending from a first end to a second end along a rotation axis, and comprising an insert pocket at the first end;
a cutting insert secured to the insert pocket, and comprising:
an upper surface facing toward the second end of the holder,
a cutting edge, and
a through-hole;
a clamp member securing the cutting insert to the insert pocket; and
a screw inserted in the insert pocket, being in contact with the upper surface of the cutting insert, and comprising:
a first surface facing toward the first end of the holder,
the first surface comprising a first engagement portion that is located within the through-hole in a front view of the first end.

2. The cutting tool according to claim 1, wherein the first engagement portion is located inside the through-hole.

3. The cutting tool according to claim 1, wherein the first engagement portion has a concave shape.

4. The cutting tool according to claim 2, wherein the screw includes:
a first portion comprising a thread groove, screwed into the insert pocket;
a second portion comprising the first surface, inserted in the through-hole; and
a third portion located between the first portion and the second portion, located between the cutting insert and the insert pocket, and being in contact with the cutting insert and the insert pocket.

5. The cutting tool according to claim 4, wherein the screw comprises an annular recess between the second portion and the third portion, and the recess is spaced from the cutting insert.

6. The cutting tool according to claim 4, wherein the first portion is cylindrical and comprises:
a first section adjacent to the third portion, and
a second section adjacent to the third portion with the first section therebetween, and comprises the thread groove, and
the first section has an outer diameter larger than an outer diameter of the second section.

7. The cutting tool according to claim 6, wherein the second section is longer than the first section.

8. The cutting tool according to claim 4, wherein the third portion comprises a tapered portion with an outer diameter decreasing from a side of the second portion toward a side of the first portion.

9. The cutting tool according to claim 1, wherein the clamp comprises a second engagement portion, and the first engagement portion of the screw has the same shape as the second engagement portion of the clamp.

10. The cutting tool according to claim 1, wherein the screw extends longitudinally in the direction along the rotation axis.

11. The cutting tool according to claim 1, wherein
the through-hole extends from the upper surface to a lower surface of the cutting insert, the upper surface opposite the lower surface, and
the cutting insert is secured by the insert pocket and the clamp along a direction perpendicular to a line extending perpendicularly from the upper surface to the lower surface.

12. A method for manufacturing a cut workpiece, the method comprising:
rotating the cutting tool according to claim 1;
placing the cutting edge in the cutting tool in contact with a workpiece material; and
moving the cutting tool away from the workpiece material.

13. A cutting tool, comprising:
a holder extending from a first end to a second end along a rotation axis, and comprising an insert pocket;
a cutting insert secured to the insert pocket, and comprising:
an upper surface facing towards the insert pocket,
a cutting edge, and
a through-hole;
a clamp member laterally securing the cutting insert to the insert pocket; and
a screw inserted in the insert pocket, and comprising:
a third portion having a larger diameter than any other portion of the screw and abutting the upper surface of the cutting insert on one side of the third portion and abutting a surface of the insert pocket on another side of the third portion.

14. The cutting tool according to claim 13, wherein
the screw further comprises a second portion located within the through-hole, the second portion comprising a first engagement portion located within the through hole.

15. The cutting tool according to claim 14, wherein
the insert pocket comprises a threaded hole,
the screw further comprises a first portion extending into the threaded hole, and
the third portion is exposed from the threaded hole.

16. The cutting tool according to claim 14, wherein
the screw further comprises an annular recess located between the second portion and the third portion, the annular recess forming a gap between the screw and the cutting insert.

17. The cutting tool according to claim 14, wherein,
the third portion comprises a part tapered from a side of the third portion nearest the second portion to an opposite side of the third portion.

18. A cutting tool, comprising:
a holder elongated, extending from a first end to a second end along a rotation axis, and comprising an insert pocket at the first end;
a cutting insert secured to the insert pocket, and comprising a cutting edge and a through-hole;
a clamp member securing the cutting insert to the insert pocket; and
a screw inserted in the insert pocket, being in contact with the cutting insert, and comprising:
a first surface facing toward the first end of the holder, the first surface comprising a first engagement portion located within the through-hole;
a first portion comprising a thread groove, screwed into the insert pocket;
a second portion comprising the first surface, inserted in the through-hole; and
a third portion located between the first portion and the second portion, located between the cutting insert and the insert pocket, and being in contact with the cutting insert and the insert pocket.

19. The cutting tool according to claim 18, wherein
the screw comprises an annular recess between the second portion and the third portion, and the recess is spaced from the cutting insert.

20. The cutting tool according to claim 18, wherein
the first portion is cylindrical and comprises:
a first section adjacent to the third portion, and
a second section adjacent to the third portion with the first section therebetween, and comprises the thread groove, and
the first section has an outer diameter larger than an outer diameter of the second section.

* * * * *